United States Patent [19]
Cox et al.

[11] Patent Number: 6,101,034
[45] Date of Patent: Aug. 8, 2000

[54] TUNABLE MULTISPECTRAL OPTICAL FILTER AND IMAGING APPARATUS

[76] Inventors: James Allen Cox, 1842 26th Ave. NW., New Brighton, Minn. 55112; Bernard S. Fritz, 1280 Deerwood Dr., Eagan, Minn. 55123

[21] Appl. No.: 08/598,954

[22] Filed: Feb. 9, 1996

[51] Int. Cl.[7] .................................................. G02B 27/46
[52] U.S. Cl. .................... 359/562; 359/559; 359/565; 359/615; 359/900; 359/399
[58] Field of Search ..................... 359/559, 562, 359/564, 569, 615, 565, 566, 900, 399, 362; 382/162, 163, 165, 264, 263; 356/331, 332

[56] References Cited

U.S. PATENT DOCUMENTS

| | | | |
|---|---|---|---|
| 3,185,021 | 5/1965 | Thompson | 359/615 |
| 3,563,659 | 2/1971 | Thompson | 356/331 |
| 3,821,794 | 6/1974 | Yoneyama | 359/559 |
| 4,965,441 | 10/1990 | Picard | 250/201.3 |
| 5,444,236 | 8/1995 | Ludington et al. | 250/208.1 |
| 5,610,734 | 3/1997 | Aharoni et al. | 359/15 |

FOREIGN PATENT DOCUMENTS

| | | | |
|---|---|---|---|
| 0095759 | 12/1983 | European Pat. Off. | 356/331 |
| A 58-147709 | 9/1983 | Japan | 356/331 |
| A 63-81321 | 4/1988 | Japan | 359/559 |
| A 63-210631 | 9/1988 | Japan | 356/331 |

OTHER PUBLICATIONS

N. K. Shi, "Color–Sensitive Spatial Filters," Optics Letters, vol. 3, No. 3, pp. 85–87, Sep. 1978.

*Primary Examiner*—Jon W. Henry
*Assistant Examiner*—John Juba, Jr.

[57] ABSTRACT

Disclosed is a tunable multispectral optical apparatus for forming a spectrally processed image of a scene having finite angular extent or alternatively a point source of light, both of which may include multispectral components. A spatial filter is selectively positioned between a hybrid fore-optic and a hybrid reimaging optic, both of which include a diffractive optic. Spectral selectivity is obtained by proper positioning of the spatial filter relative to the intermediate image formed by the hybrid fore-optic before impinging on the hybrid reimaging optic. The tunable multispectral optical apparatus of the present invention may take the form of a bandpass filter or a bandstop filter depending only on the choice of spatial filter—blocking or passing selective wavelength components of the intermediate image.

20 Claims, 19 Drawing Sheets

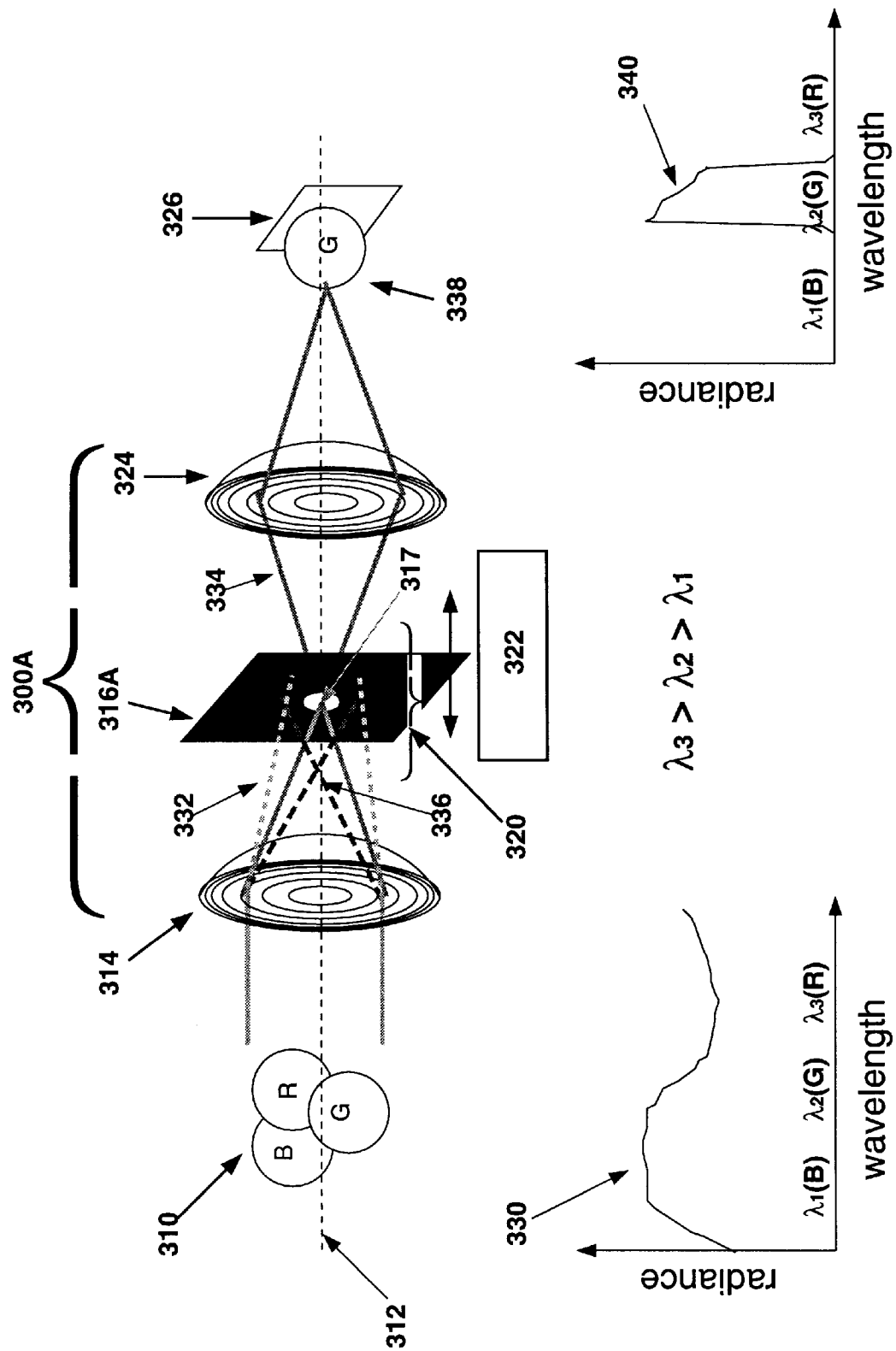

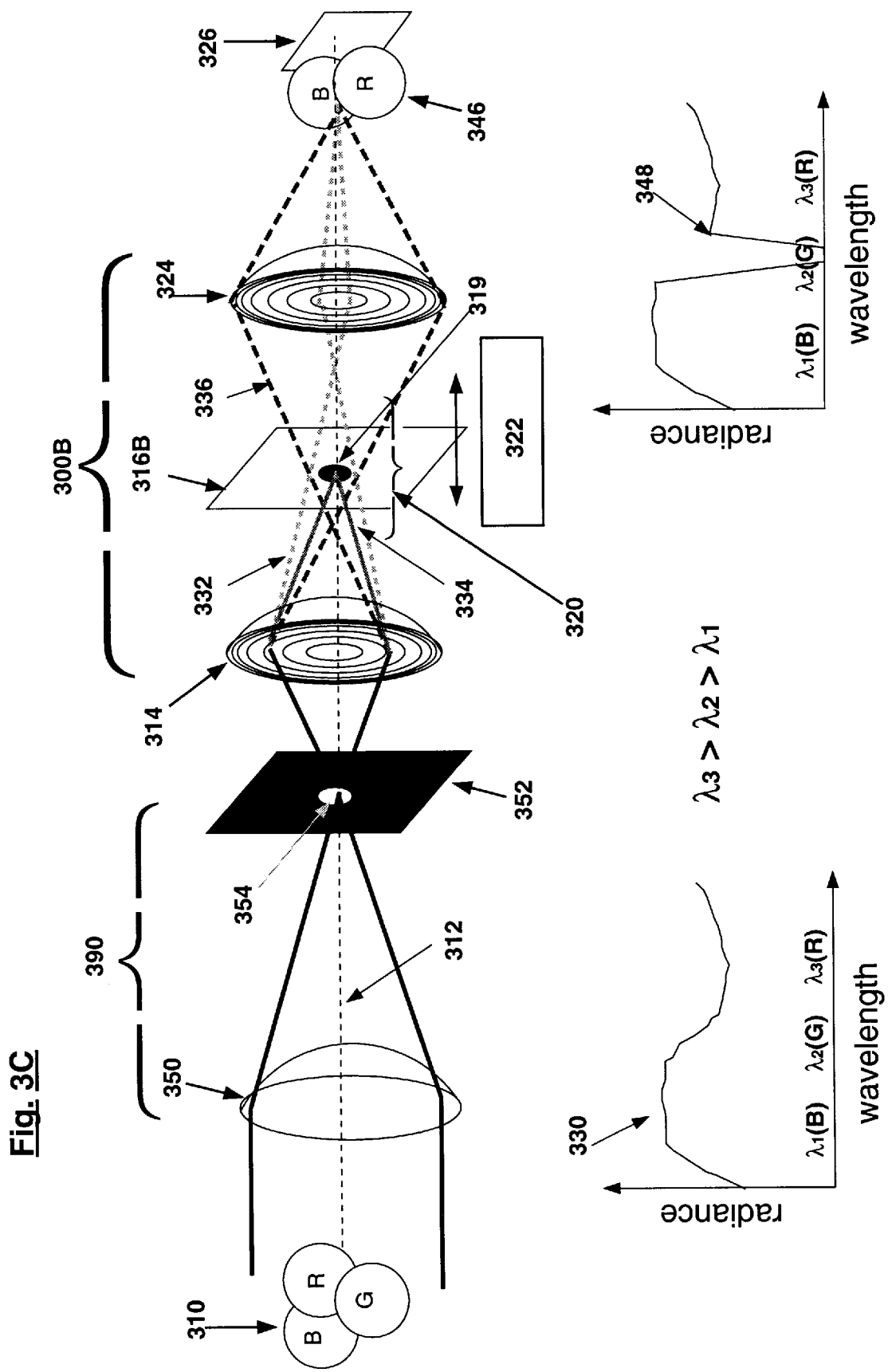

| OPTICAL SYSTEM PARAMETERS | |
|---|---|
| FIELD OF VIEW | 20 degs |
| WAVEBAND | 656-486 nm |
| SCAN LENGTH | 5 mm |
| ENTRANCE PUPIL DIAMETER | 15 mm |
| IMAGE SPACE F/# | 1.5 |
| IMAGE SIZE | 8 mm x 8mm |
| IMAGE PIXEL FILL FACTOR (area) | 30% |
| IMAGE PIXELS | 700 x 700 |
| TRANSMITTING ARRAY SIZE | 30 mm |
| TRANSMITTING APERTURE FILL FACTOR (area) | 9% |

TUNABLE MULTISPECTRAL OPTICAL FILTER AND IMAGING APPARATUS

BACKGROUND OF THE INVENTION

1. Field of the Invention

This invention relates generally to the field of optical devices used to form an image of an extended scene having selectable spectral frequency bands. More specifically, the present invention is directed to a tunable multispectral filter for forming an image having selectable spectral frequency bands for subsequent spectral image detection and/or recordation of high resolution imagery covering large angular extent.

2. Description of the Related Art

Spectral imaging devices are classified generally as either interferometric or dispersive, according to the basic physical principle used to resolve the image into its spectral components, and in turn be viewed by an eye, recorded, and/or processed as desired. The desired objective of such devices is to form imagery of a scene containing extended objects subtending large angular extent with high spatial resolution in selectable spectral bands by selecting light or radiation in one narrow wavelength band. Depending on the specific application, a narrow wavelength band of the light radiation from the scene may be either passed or rejected from the total spectral band of the scene of interest. Spectral imaging devices of the type described find wide application in monitoring of earth resources, the atmosphere, agricultural and forestry resources, monitoring weather conditions from both aircraft and spacecraft, astronomy, target detection and recognition to name just a few.

Spectral imaging devices desirably have the capability of tuning to the center wavelength of a selected waveband, and be tunable to any wavelength in the broad spectral band of the sensitivity range of the instrument. It is desirable to have such devices capable of selecting or varying the bandwidth of the selected waveband. Accordingly, devices employing a set of filters with fixed spectral transmissive or reflective properties, implemented for example as a stepped mechanical filter wheel, does not provide such spectral agility. Thus sensing instruments having fixed filters have limited utility for many of applications.

Spectral imaging devices employing wavelength dispersive techniques have been taught to provide both imaging and spectral tunability. These devices generally resemble the classical form of imaging monochromators and spectrometers which makes use of a lens or mirror system to pass an image through a receiving input slit onto an output slit via a dispersive element, such as a diffraction grating or prism. With this arrangement the image of at the input slit is projected as a spectrum on the output slit plane, and, by selection of the position of the output slit it is possible to select a small specified wavelength band, the center wavelength of which can be varied by shifting the slit or dispersive element.

One example of the classical type employing an angular dispersion technique as just described is illustrated in U.S. Pat. No. 4,705,396, issued to Bergstrom, and particularly illustrated in FIG. 1A, herein. Bersgstrom includes an inner optical system, consisting of the classical two-slit monochromator described above with a diffraction grating to disperse the various wavelengths to be sampled, and an outer optical system, comprising an objective optics which forms an image of a scene on a recording means. The essential feature of Bergstorm's invention is to place the slits of the inner optical system at the aperture stop of the outer optical system. Bergstrom requires three optical stages and hence large volume. With the slits at the aperture stop of the outer optical system, spectral filtering is achieved by means of a spatial filter at the pupil rather than at an intermediate image plane. The use of a slit instead of the more common circular aperture at the stop of the objective optics greatly reduces the image quality of the system. This fact, together with the requirement that light incident on the diffraction grating be only slightly convergent or divergent, greatly limits the angular field-of-view over which Bergstrom's invention is capable of forming sharp imagery.

In contrast to Bergstrom, tunable spectral imaging devices employing longitudinally dispersive optical elements are described in U.S. Pat. No. 4,742,222, issued to Retfalvy, et al, and U.S. Pat. No. 5,479,258 issued to Hinnrichs, et al. FIG. 1B shows the imaging device of Retfalvy et al., and FIG. 1C shows the imaging device of Hinnrichs, which are fundamentally different from the classical monochromators and spectrometers which make use of angular dispersion. These latter mentioned imaging devices employ a simple single optical system having longitudinal chromatic dispersion, i.e., the various wavelengths incident on the optical system are dispersed along the optical axis. The method of Retfalvy et al. makes use of dispersive refracting materials to form the optical system, while the method of Hinnrichs et al. makes use of a single diffractive lens. The underlying principle of both methods is that the focal length of the optical system depends on observed image wavelength, and that at any set distance only a narrow range of wavelengths will be in sharp focus, as diagramatically illustrated in FIGS. 2B and 2C, corresponding to the imaging optics of FIGS. 1B and 1C, respectively. There are significant limitations with both methods, as described below.

Common to the imaging systems of both Retfalvy et al. and Hinnrichs is that they are intended to only detect and/or process point-like objects. That is, both imaging systems provide spectral content of objects which are not resolved in the image plane of the optics. Retfalvy et al. provide spectral tunability by translating a small aperture, such as an optical fiber, along the optical axis of the dispersive refracting lens, and at each focal distance the size of the aperture limits the range of wavelengths from the point-like object passed to an output image detector. In their method, the focal length varies in proportion with the wavelength; thus, shorter wavelengths are focused closest to the lens and longer wavelengths are focused farthest from the lens. However, since Retfalvy et al. rely on dispersive refracting materials, the size of the light distribution (blur spot) forming the image of the point object also varies with wavelength, with longer wavelengths having a larger distribution than shorter wavelengths as illustrated in FIG. 2B, requiring Retfalvy et al. to construct the size of the aperture in an adjustable fashion. Furthermore, the intended application of their device is wavelength demultiplexing in an optical communication system. Such a system presents only a single point source in a narrowly confined angular extent to the optical system. The method of Retfalvy et al. is not intended nor suited to cover a large angular extent containing a large number of point-like objects or a continuous scene. Retfalvy et al. is particularly limited by the need for an adjustable aperture and the restriction to a very small angular field-of-view. Hinnrichs et al. (FIG. 1C) relies on the dispersive properties of a diffractive lens in which the focal length varies inversely with wavelength, as illustrated in FIG. 2C. A two-dimensional electronic detector array is located in the focal region of the diffractive lens. Each detector (pixel) in the array in effect serves as the aperture as in the method of Retfalvy et al., but because a two-dimensional array is employed, the method of Hinnrichs et al can be applied to a larger angular field-of-view. Spectral tunability is achieved by translating the diffractive lens along the optical axis, bringing different wavelengths into sharp focus on the detector array. All wavelengths from the target and background are sensed simultaneously by the detector array, but the radiation in a narrow spectral band from a point target in sharp focus will project above the diffuse background signal, and the application of a spatial filtering algorithm in an electronic computer can be used to subtract the background signal, leaving only the signal from the point source in the sharply focused narrow spectral band.

The imaging device of Hinnrichs et al. has several disadvantages. Because all wavelengths are integrated simultaneously by the detector array and the desired spectral signal is extracted by frame subtraction, it works well only for a collection of well-separated point-like objects in an uncluttered background as one would find, for example, in aircraft or missiles at great distance against a sky background. Their method does not give clear spectral imagery of cluttered scenes or with extended objects having internal variations in brightness such as one finds in many applications of interest. Further, because the optical system consists of a single diffractive lens, image quality produced by the optics degrades with increasing field angle off the optical axis due to aberrations such as coma and astigmatism. Although this feature is not a severe limitation if one is interested only in viewing point targets against an uncluttered background, it is a serious limitation if imagery of cluttered scenes and extended objects is required. Because the focal length varies with wavelength, it is clear that the angular extent subtended by the image of an object will also vary with the wavelength to which the system is tuned; equivalently, the magnification of the system will vary with wavelength. For example, the apparent size of an object (it's image) will be larger when the sensor is tuned to red light than when tuned to blue light.

Accordingly, in view of the foregoing limitations of spectral imaging devices of the prior art, there is a need for imaging devices which provide a spectrophotometric imaging device capable of obtaining high quality imagery of scenes and extended objects which can subtend a wide angular field-of-view, and which can exhibit large variations in internal radiance or luminance, and to provide the imagery by tunable spectral composition in ultraviolet, visible, or infrared radiation.

SUMMARY OF THE INVENTION

It is another object the present invention to provide a spectrophotometric imaging means which can be tuned to any desired wavelength in a broad radiation waveband.

It is another object the present invention to provide a spectrophotometric imaging means to enable variable bandwidth about the tuned central wavelength.

It is another object the present invention to provide a spectrophotometric imaging means which can pass or transmit a narrow spectral band to the output image detector.

It is another object the present invention to provide a spectrophotometric imaging means which can reject or reflect a narrow spectral band of the scene in view.

It is another object the present invention to provide a spectrophotometric imaging means to enable imaging in selectable spectral bands with constant image size and thus to provide magnification independent of tuned wavelength.

It is another object the present invention to enable a spectrophotometric imaging means to provide the imagery in the selected spectral band directly without the need for additional signal processing.

It is another object and advantage to integrate spatial filtering with optical imaging to enable spectrophotometric imaging wherein distortion is corrected in the spatial filter and thus simplifying the imaging optical components.

It is another object the present invention to provide a spectrophotometric means which can quickly change spectral bands and thus can exhibit fast response time.

The tunable multispectral optical apparatus of the present invention forms a spectrally processed output image of a scene having finite angular extent or alternatively a point source of light, both of which may include multispectral components. A spatial filter is selectively positioned between a hybrid fore-optic and a hybrid reimaging optic, both of which include a diffractive optic. Spectral selectivity is obtained by proper positioning of the spatial filter relative to the intermediate image formed by the hybrid fore-optic before impinging on the hybrid reimaging optic. The tunable multispectral optical apparatus of the present invention may take the form of a bandpass filter or a bandstop filter depending only on the choice of spatial filter—blocking or passing selective wavelength components of the intermediate image.

One embodiment of the present invention includes a translation means coupled to the optical spatial filter to vary the location of the spatial filter array along the optical axis. The longitudinal location of the spatial filter in the intermediate image region determines the central frequency of the spectral waveband passed on to the hybrid reimaging optic, and by varying this location with a translation means, a capability is provided for a tunable spectral filter in an imaging optic to select any central frequency in the entire spectral region.

Further, by arranging the spatial filter to be either a two-dimensional array of transmissive apertures in a non-transmissive screen or a two-dimensional array of non-transmissive apertures in a transmissive screen, then the spectral filter has the form of either a bandpass filter or a bandstop filter, respectively.

BRIEF DESCRIPTION OF THE DRAWINGS

FIG. 3A illustrates a schematic diagram of an optical system, and corresponding input and output radiance characteristics, for a tunable multispectral optical filter, configured as a bandpass filter, in accordance with the present invention.

FIG. 3C illustrates another schematic diagram of an optical system, and corresponding input and output radiance characteristics, for a tunable multispectral optical filter, configured as a bandstop filter, in accordance with the present invention.

DESCRIPTION OF THE PREFERRED EMBODIMENT

Definition of Terms

Figure 1A:
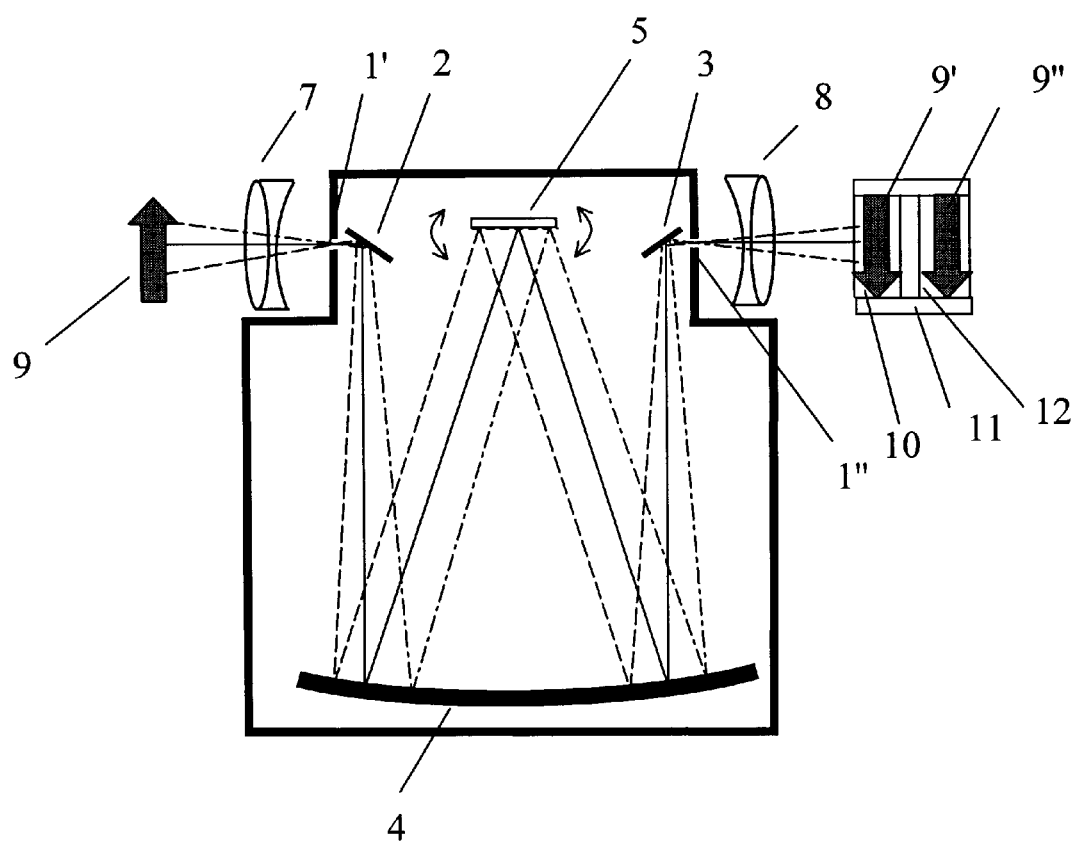
FIGS. 1A, 1B, and 1C illustrate schematic diagrams of optical systems of the prior art.
Figure 1B:
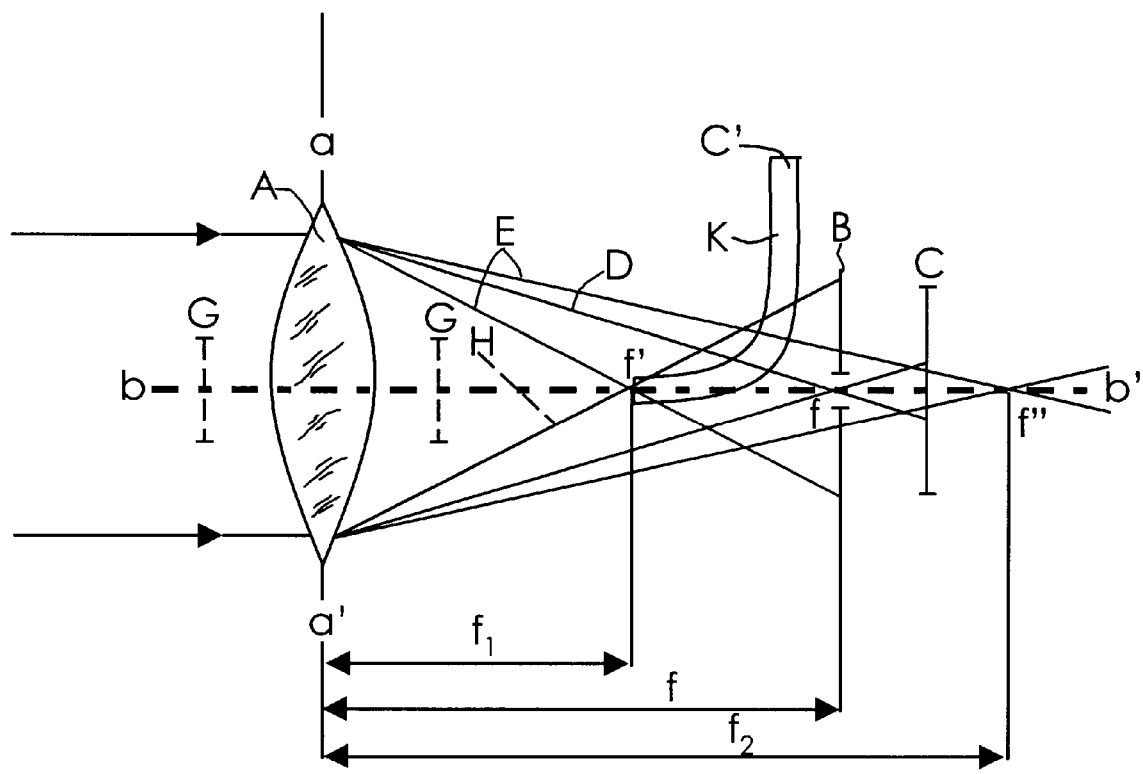
Figure 1C:
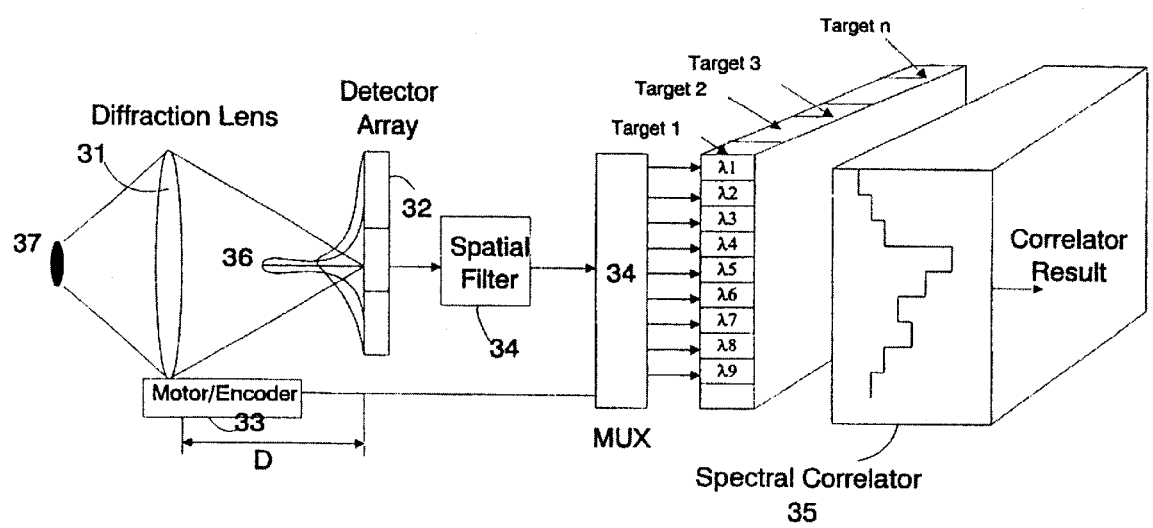

A diffractive optic or diffractive device as used in the following exposition, is an optical device, optical element, or group of optical elements, which utilizes the physical principle of optical diffraction to affect optical wavefronts passing therethrough, and utilizes optical diffraction in an image forming capacity. Familiar examples of a diffractive optic are zone plates, volume holographic lenses, and surface relief kinoform lenses, holographic lenses, binary optics, computer generated holograms, and diffraction gratings. Fabrication methods of diffractive devices may include, among others, diamond machining, interference of coherent beams, several forms of advanced microlithographic, and etching techniques. Diffractive devices may be manufactured in large quantities by several replication methods, such as injection molding, embossing, and replicative transfer.

A hybrid optic, as used herein, is an optical device which comprises (i) at least one diffractive optic, and (ii) at least one conventional optical element, e.g., a refractive optical element (lens) or reflective optical element (mirror). A hybrid optic may include any combination and number of conventional optical elements and may include more than one diffractive optic. Further, a hybrid optic may be one in which the optic axis of the optical elements are collinear or simply aligned and employ folding. In some circumstances, it may be desirable for the optic axis of one or more of the optical elements to be in non-alignment.

A hybrid element, as used herein, is intended to imply a conventional optical element (lens or mirror) having at least one diffractive surface in which the optical wavefront passes therethrough. A hybrid optic, therefore, implies at least one hybrid element or a diffractive device along with one or more conventional optical elements.

Spectral properties of optics and filters may be described either in terms of frequency or in terms of wavelength, which terms are inversely proportional to each other. A tunable spectral bandpass filter is spectrally the complement of a tunable spectral band rejection filter. A bandpass filter has high transmission values for electromagnetic waves of a selected band or range of frequencies, but has low transmission values for those frequencies below and above the selected band of frequencies. A band rejection filter, also called a bandstop filter or a band elimination filter, suppresses transmission of electromagnetic waves of a selected band or range of frequencies, and has high transmission values only for frequencies below and above the selected band of frequencies. Spectral bandwidth, or simply bandwidth, is a measure of the range of frequencies corresponding to the selected band of either a bandpass or a bandstop filter A tunable spectral filter is a bandpass or bandstop filter which may be controlled for varying the center frequency of a selected bandwidth, and which is tunable over a broad spectral range.

Optical terms used herein have generally the same known attributes as known to those skilled in the art of optics. Terms such as optical axis associated with an optical component, focal point, image plane, pupil location, aperture stop and the like are terms well known in the art.

Single Point Source Radiation

In order to facilitate understanding of the present invention, a simple embodiment in accordance with the principles of the present invention will first be described as particularly illustrated in FIGS. 3A–C. These figures illustrate a single point source located on the optical axis of the tunable spectral bandpass filter in accordance with present invention. This will facilitate the description of the preferred embodiment of the invention illustrated in FIGS. 4A–B for particular application in achieving spectral filtering of an image over a large angular extent.

FIG. 3A illustrates a schematic diagram of a tunable multispectral optical filter system 300A in accordance with the present invention, and corresponding input spectrum characteristic 330, and output spectrum characteristics 340, configured as a "bandpass" filter. Optical filter system 300A includes an image receiving hybrid optic 314 (hereafter referred to as hybrid fore-optic 314), a spatial filter 316A, and an image forming hybrid optic (hereafter referred to as hybrid reimaging optic 324), all of which have an optical axis associated therewith and collinear with reference optic axis 312.

Further illustrated in FIG. 3A is a multispectral point source 310 lying on reference axis 312 intended to be in view of hybrid fore-optic 314. Also shown, is an output image detector means 326, and translation means 322 coupled to spatial filter 316A serving to selectively translate spatial filter 316A longitudinally along optic reference axis 312 and between hybrid fore-optic 314 and hybrid reimaging optic 324. ("Image plane" as used herein is the spatial location where the spectral image or wavelength component of the image or point source is in sharp focus.)

For exposition purposes, consider multispectral point source 310 as being capable of emitting optical radiation in one wavelength or a plurality of wavelengths, and having a continuous point source emission spectrum indicated by input spectrum characteristic 330. For purposes of illustration, three wavelengths, $\lambda_1$, $\lambda_2$, and $\lambda_3$, are identified to represent the center wavelengths of three spectral wavebands. In the visible spectrum these could correspond to the blue (B), green (G), and red (R) wavebands, respectively. For purposes of visually following the optical radiation from the point source 310, optical rays 332, 334, and 336 correspond to spectral wavebands, $\lambda_1(B)$, $\lambda_2(G)$, and $\lambda_3(R)$, respectively. In the following exposition, the corresponding alpha/numeral designations of the spectral wavebands will be given together to assist the reader.

The intent of the tunable multispectral optical filter system 300A is to form a sharp, high quality spectral point source output image 338 of multispectral point source 310 at output image detector means 326 for a selectable spectral waveband, for example $\lambda_2(G)$ 334, as illustrated by point source filtered output spectrum or radiance characteristic 340. In the present invention, this is achieved by first forming an emerging "intermediate image" of multispectral point source 310 with hybrid fore-optic 314. Because of the diffractive optic associated with hybrid fore-optic, the hybrid fore-optic forms an intermediate image of the scene in a volume containing the optical axis of the hybrid fore-optic such that there exists an image plane associated with each optical wavelength component of the intermediate image, and where the intermediate image wavelength components and their corresponding image planes are dispersed longitudinally along the optical axis, and specifically optical reference axis 312 according to wavelength in intermediate image region 320, as was illustrated conceptually in FIG. 2C. The focal distance varies inversely with wavelength in a manner that can be precisely predicted and measured by those familiar with optics theory and methods.

Secondly, spatial filter 316A is located with translation means 322 at a specific position on optical axis 312 where a desired wavelength is brought to sharp focus by hybrid fore-optic 314. Spatial filter 316A is illustrated consisting of a small transparent aperture 317, such as a pinhole, in an otherwise optically non-transmissive screen. Spatial filter 316A, with a transparent aperture of dimension substantially equal to the radiation distribution of a point source image formed by hybrid fore-optic 314, passes only those wavelengths in a narrow waveband in sharp focus, and substantially rejects all other wavelengths, thereby yielding point source filtered spectrum 340 as observed by output image detector means 326.

FIG. 3A shows spatial filter 316A positioned at the focus of wavelength $\lambda_2(G)$ 334, which corresponding optical wavefronts pass through aperture 317 onto hybrid reimaging optic 324, while corresponding optical wavefronts of defocused wavelengths, such as $\lambda_1(B)$ 332 and $\lambda_3(R)$ 336, are blocked or rejected by the non-transmissive portions of spatial filter 316A. Aperture 317 in spatial filter 316A forms an effective point source at the intermediate image distance containing only wavelengths of the waveband as indicated in point source filtered spectrum 340.

In turn, those optical wavefronts passing through aperture 317 are intended to impinge upon hybrid reimaging optic 324. Hybrid reimaging optic 324 is intended to be constructed so as to exhibit spectral longitudinal dispersion in the opposite sense of that exhibited by hybrid fore-optic 314 so as to form a resultant point source output image 338 at output image detector means 326. A more detailed description of hybrid reimaging optic will be described below.

Figure 3B:
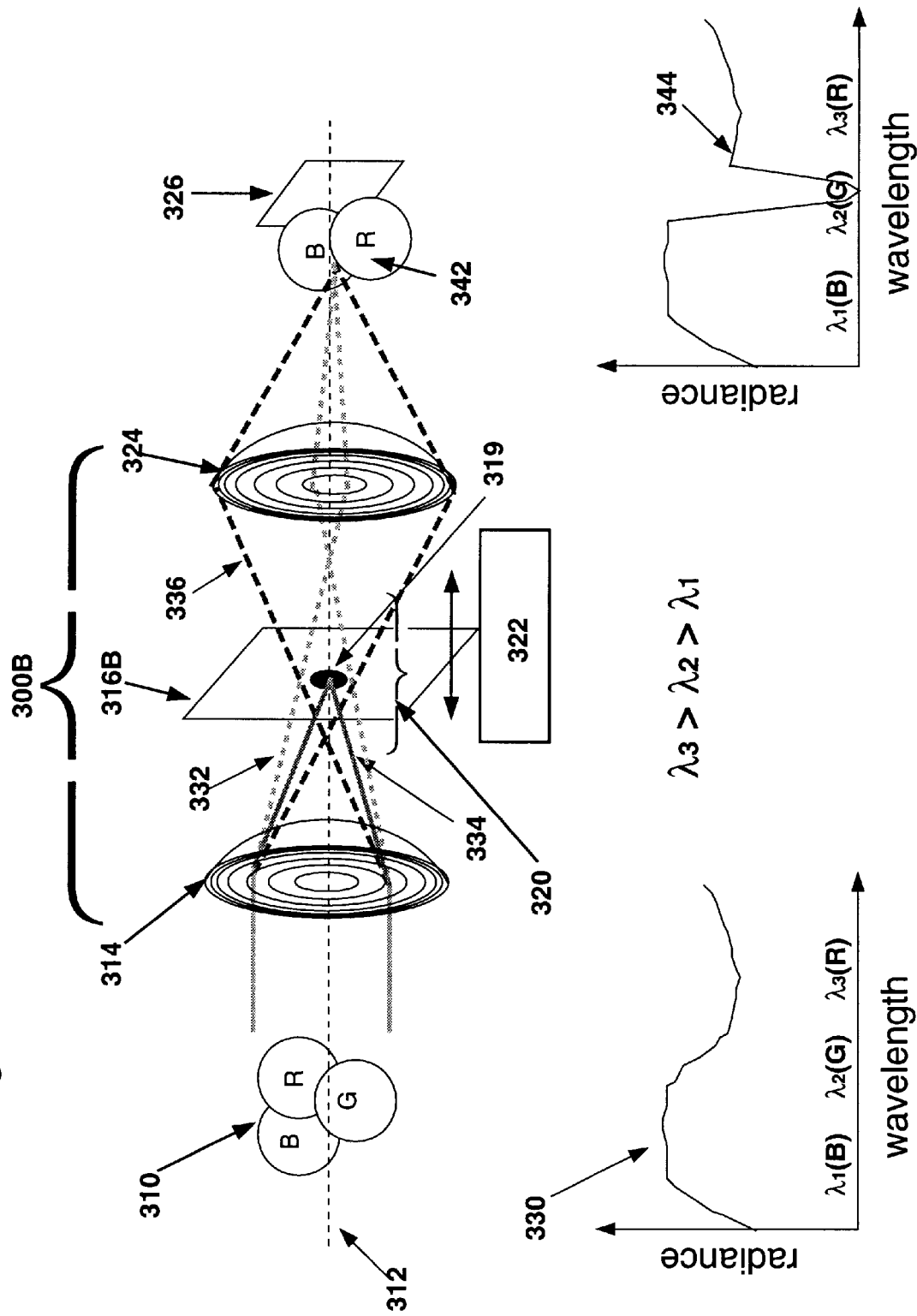
FIG. 3B illustrates a schematic diagram of an optical system, and corresponding input and output radiance characteristics, for a tunable multispectral optical filter, configured as a bandstop filter, in accordance with the present invention.

FIG. 3B illustrates a schematic diagram of a tunable multispectral optical filter system 300B in accordance with the present invention, and corresponding input spectrum characteristic 330, and output spectrum characteristics 344, configured as a "bandstop" filter. In FIG. 3B, similarly functioning and arranged components as those in FIG. 3A have retained the same numeral designations. FIG. 3B is essentially the same as FIG. 3A with spatial filter 316B substituted for spatial filter 316A.

In FIG. 3B, spatial filter 316B is the transmissive complement of spatial filter 316A. As illustrated, spatial filter 316B consists of a small non-transmissive aperture, such as either an opaque area or a reflective area, in an otherwise optically transmissive screen. Providing spatial filter 316B with a non-transmissive aperture (circular spot) of dimension substantially equal to a radiation distribution of point source image formed by hybrid fore-optic 314 rejects only those optical wavefronts having wavelengths in a narrow waveband, and substantially passes all other wavefronts, yielding a resultant point source filtered spectrum 344. As illustrated in FIG. 3B, spatial filter 316B is positioned at the focus of wavelength $\lambda_2(G)$ 334 as thereby blocked, while defocused wavelengths, such as $\lambda_1(B)$ 332 and $\lambda_3(R)$ 336, are passed through the transmissive portion of spatial filter 316B. Accordingly, an effective point source is formed in the intermediate image region 320 containing only wavelengths as indicated by filtered spectrum 344.

In turn, those optical wavefronts passing through those transmissive portions of spatial filter 316B are intended to impinge upon hybrid reimaging optic 324. Hybrid reimaging optic 324, as before, is intended to be constructed so as to exhibit spectral longitudinal dispersion in the opposite sense of that exhibited by hybrid fore-optic 314 so as to form a point source output image 342 at output image detector means 326.

In some applications, it is important to form a high quality image of a scene and simultaneously reject, to a large degree, radiation from a very high intensity point source of narrow bandwidth which may be located at any point in the scene. Rejection of a laser jamming source is an example of such an application. FIG. 3C illustrates the bandstop form of the present invention illustrated in FIG. 3B modified by the addition of image enhancement optics 390. Including well-corrected imaging optic 350 and sampling filter 352, each having their optical axis associated therewith aligned with optic axis 312.

In FIG. 3C, similarly functioning and arranged components as those in FIG. 3B have retained the same numeral designations. Well-corrected imaging optic 350 forms a corrected image, well corrected over the entire spectral range of interest. The optical wavefronts associated with the corrected image is projected toward hybrid fore-optic 314 through sampling filter 352 which includes a sampling aperture 354 strategically placed at the focused image formed by well-corrected imaging optic 350. Sampling filter 352 is essentially a spatial filter with properties similar to spatial filter 316A as described in FIG. 3A. Namely, sampling filter 352 provides transparent aperture 354 in an otherwise non-transmissive screen with aperture dimension matched to the radiance distribution of an image of multispectral point source 310 formed by well-corrected imaging optic 350.

In turn, hybrid fore-optic 314, as before, forms a longitudinally dispersed image of that image passing through sampling filter 352. Spatial filter 316B is positioned with translation means 322 to reject a narrow spectral point source, such as an intense laser. Hybrid fore-optic 314 precisely maps (images) the clear aperture 354 of sampling filter 352 onto the corresponding blocking aperture of spatial filter 316B. If the intense laser source to be rejected happens to be located in close proximity to the field point in the scene sampled by sampling filter 352, the laser radiation will be substantially rejected by the non-transmitting screen portions of sampling filter 352. If the intense laser source happens to be located in the transmissive aperture portion 354 of sampling filter 352, the laser radiation will be substantially rejected by the blocking aperture of spatial filter 316B, and producing an improved example point source filtered spectrum 348. Thus, for any location of the source to be rejected, the embodiment of the bandstop form of the present invention provides a tunable method of preventing intense radiation from a narrow spectral point source from reaching output image detector means 326.

In each of the three embodiments described above with reference to FIG. 3A–C, both magnitude of longitudinal dispersion and size of the transmissive aperture or blocking aperture in spatial filter 316A, 316B are two primary parameters available to the optical designer to establish the spectral filtering characteristics for a particular system or application. The degree of longitudinal dispersion in spectral frequency (or wavelength) is determined substantially by the optical power of diffractive elements contained in hybrid fore-optic 314 and hybrid reimaging optic 324. In general, a greater degree of longitudinal dispersion provides a narrower spectral bandwidth (in either bandpass or bandstop form) for a fixed aperture area in spatial filter 316A, 316B.

Further, in general, for a fixed degree of longitudinal dispersion, a smaller aperture area in spatial filter 316A, 316B provides a narrower spectral bandwidth in either bandpass or bandstop form of the invention. Optimum performance in terms of maximum radiation in the narrowest possible spectral bandwidth at output image detector means 326 is achieved by choosing the aperture area of spatial filter 316A, 316B substantially equal to an area containing a significant fraction of the radiant power in the point source image distribution formed by hybrid fore-optic 314. For example, if hybrid fore-optic 314 is capable of forming a diffraction-limited image at all frequencies in a broad spectral range of interest, then the diameter of the aperture in spatial filter 316A, 316B should equal the diameter of the Airy disk containing approximately eighty-four percent of the total radiant power in the point source image at each wavelength $\lambda$, as specified quantitatively by the formula $$d = 2.44 \cdot \lambda \cdot F\#,$$

wherein d is the diameter of the Airy disk, $\lambda$ is the wavelength, and F# is the focal ratio, or f-number, of hybrid fore-optic 314.

As shown by K. Miyamoto (J. Opt. Soc. Am., Vol. 51, No. 1, pp 17–20), the focal length and F# of a purely diffractive element, such as a Fresnel phase lens, are independent of wavelength, and thus according to the expression above the extent of radiant power distribution in a point source image formed by a purely diffractive fore-optic is also independent of wavelength, thus making one aperture area in spatial filter 316A, 316B capable of providing the same spectral bandwidth at all wavelengths. In a hybrid optic, this condition is no longer true, but as will be shown by a later example, it is possible to achieve point source image radiant power distributions which do not vary significantly with wavelength because most of the longitudinal dispersion is provided by the diffractive elements in the hybrid optic, and thus one can achieve narrow spectral bandwidth filtering characteristics at all wavelengths over a broad spectral range with a fixed aperture area in spatial filter 316A, 316B.

It is also evident that broader spectral bandwidths can be achieved in a specific embodiment of our invention possessing an inherently smaller bandwidth by causing the spatial filter to dither, or oscillate, through the region corresponding to a desired broader bandwidth during the temporal integration period of output image detector means 326.

Output Image Detector Means

In the foregoing exposition, output image detector means 326 is intended to be suited to the broad spectral frequency of interest and desired spatial resolution over the angular field viewed. As used herein, "output image detector" includes any means responsive to a formed output image or point source of optical radiation suited to the broad spectral frequency of interest and to the desired spatial resolution over the angular field viewed. Further, "output image detector" as used herein generally includes any means for capturing, recording, or photo-radiation-converting devices for processing an output image or point source from image forming optics.

For example, "output image detector" as used herein make take the form of photographic film or the like, an observer's eye, an image intensification device, a two-dimensional array of electronic photo detectors sensitive in an appropriate frequency band (e.g., ultraviolet, visible, infrared), a one-dimensional array of electronic photo detectors used with a scanning mechanism to cover the angular field, a single electronic detector used within a scanning mechanism to cover the angular field, fiber optic bundle optically connected to discrete photo detectors, and the like.

Extension to Large Field-of-View

Modern electronic imaging instruments achieve high quality imagery of such scenes first by providing an optical component which forms an optical output image of the scene, referred herein as the output image, with required quality, and secondly, by sampling the output image with an output image detector having an array of discrete photo detecting elements. Each photo detecting element of the sampling array generally has some active area which converts the incident radiance into an electrical signal. The ratio of the active area to the area of the unit cell of the detector element represents a sampling aperture and is commonly referred to as the "fill factor". Application of such detectors permits extension of the tunable multispectral optical filter system 300A, 300B, described above for a single on-axis point source to scenes and objects which subtend large angular fields as particularly illustrated in FIGS. 4A and 4B.

Figure 4A:
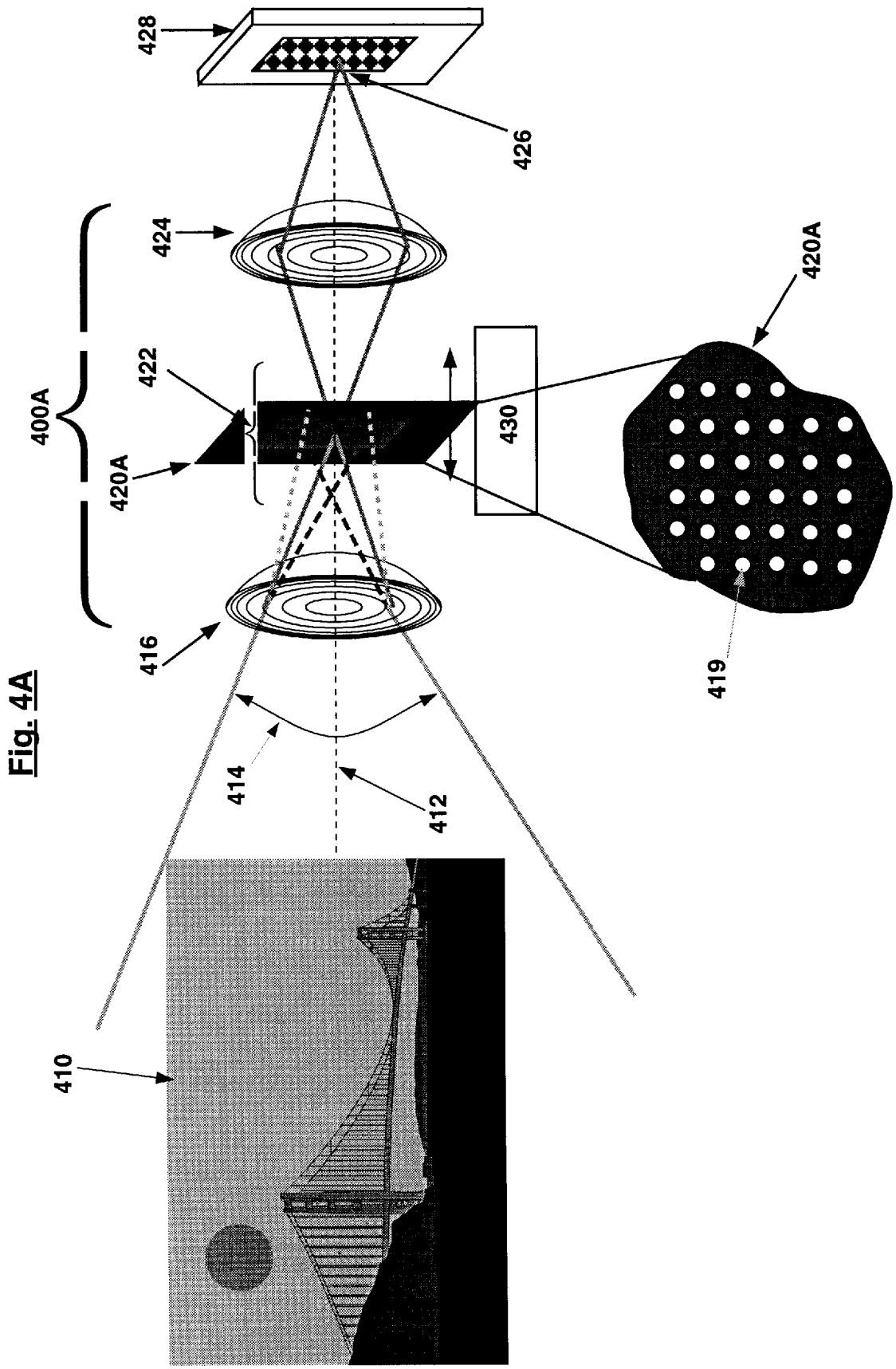
FIG. 4A is a perspective view of a schematic diagram of an optical system in accordance with the present invention, and configured as a bandpass filter.

FIG. 4A illustrates a schematic diagram of a tunable multispectral optical filter system 400A in accordance with the present invention and which is configured as a "bandpass" filter applicable for a point source as well as a multispectral scene 410 which subtends a large angular field. Optical filter system 400A includes an image receiving hybrid fore optic 416, a spatial filter 420A, and an image forming hybrid optic 424, all of which have an optic axis associated therewith and collinear with reference optic axis 412. FIG. 4A further illustrates a output image detector 428 and translation means 430, serving a similar function as translation means 322 of FIG. 3A, i.e., translation of spatial filter 420A along the optic reference axis 412.

Hybrid fore optic 416, spatial filter 420A, and an image forming hybrid optic 424, are arranged and function similarly to those corresponding components 314, 316A, and 324 of tunable multispectral optical filter system 300A, respectively of FIG. 3A. For multispectral scene 410 which subtends a large angular field extended, hybrid fore-optic 416 is constructed to provide selected image quality over angular field 414. Like hybrid fore-optic 316A, hybrid fore-optic 416 forms an intermediate image which is dispersed longitudinally along optical axis 412. However, hybrid fore-optic 416 may necessitate a more complex assembly of optical components so as to provide a quality intermediate image of the scene 410 extending over angular field 414.

Spatial filter 420A is illustrated in FIG. 4A as a two-dimensional array of optically transmissive apertures 419 which may be realized, for example, as an array of pinhole apertures in an otherwise optically non-transmissive screen. The spectral bandpass characteristics of tunable multispectral optical filter system 400A are substantially determined by the amount of longitudinal dispersion produced by hybrid fore-optic 416, and by the diameter and spacing of apertures 419 in spatial filter 420A in a manner closely analogous to the single aperture example described with reference to FIG. 3A.

The spectral characteristic of the intermediate image formed by hybrid fore-optic 416 is selected by moving spatial filter 420 to the proper position on optical axis 412 using translation means 430. The spatially sampled spectral image of scene 410 determined by the position of spatial filter 420A is relayed to output image detector 428 by hybrid reimaging optic 424 which forms the output image. Hybrid reimaging optic 424 is intended to form a quality two dimensional spectrally filtered image of the scene 410 over the entire angular field 414, and therefore may require increased complexity in its realization beyond that of hybrid fore-optic 324 of FIG. 3A, but its function is essentially unchanged from that of hybrid fore-optic 324 which was intended to form an on-axis point source image.

Output image detector 428 is intended to be capable of resolving the two-dimensional output image formed by hybrid reimaging optic 424. In the preferred embodiment of the invention, output image detector 428 may consist of a two-dimensional electronic detector array, photographic film, image intensifier tube, an observer's eye, or the like, as aforesaid.

Figure 4B:
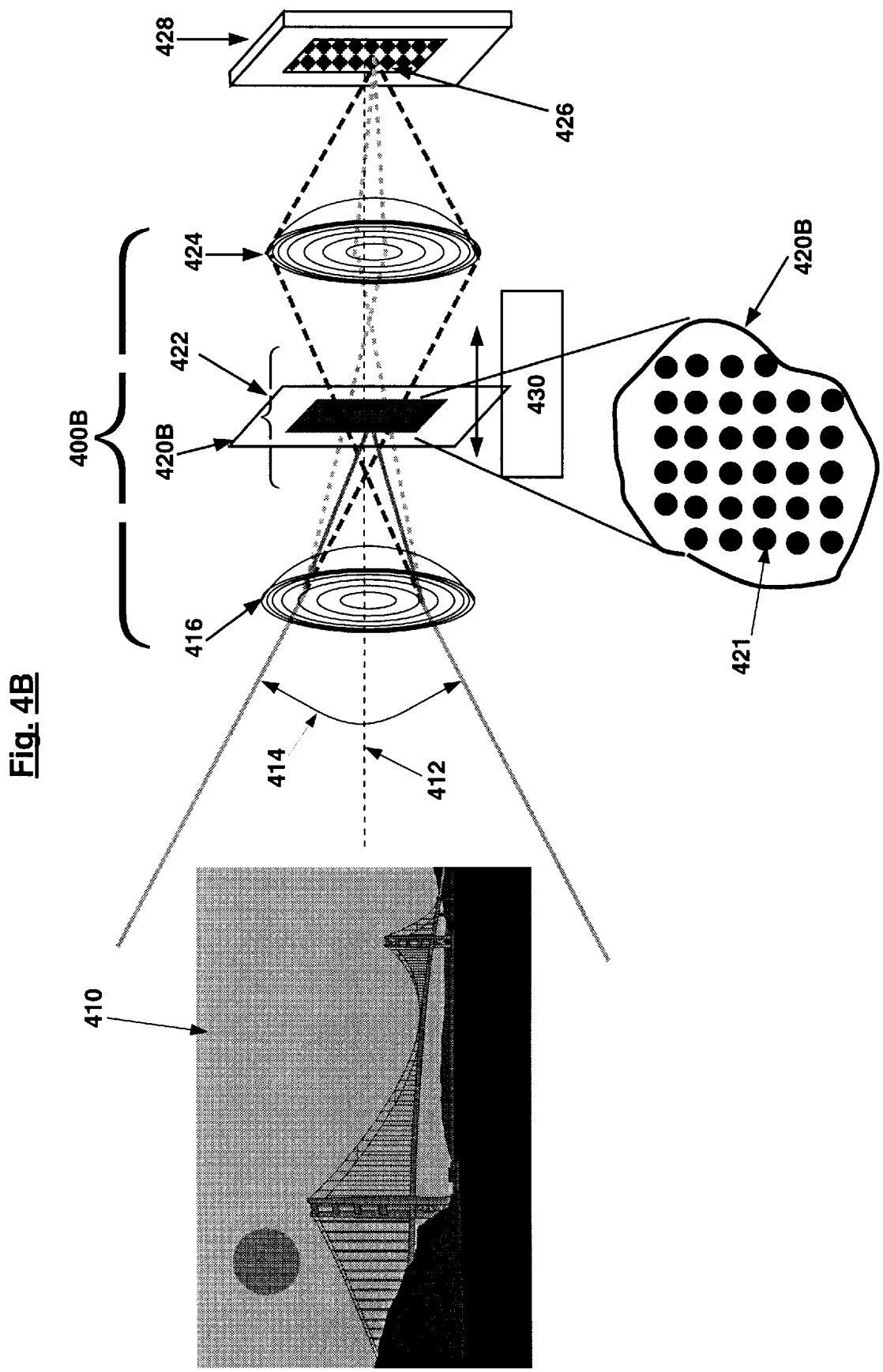
FIG. 4B is a perspective view of a schematic diagram of an optical system in accordance with the present invention, and configured as a bandstop filter.

FIG. 4B illustrates a schematic diagram of a tunable multispectral optical filter system 400B in accordance with the present invention, and which is configured as a "band-stop" filter applicable for a point source as well as a multispectral scene 410 which subtends a large angular field 414. In FIG. 4B, similarly functioning and arranged components as those in FIG. 4A have retained the same numeral designations. FIG. 4B is essentially the same as FIG. 4A with spatial filter 420B substituted for spatial filter 420A. The essential difference between the bandpass form of FIG. 4A and the bandstop form of FIG. 4B lies in the specific realization of spatial filter 420B.

In FIG. 4B, spatial filter 420B is illustrated as a two-dimensional array of nontransmitting apertures or spots 421 in an otherwise optically transmissive screen. Like the embodiment of the invention of FIG. 4A, the bandstop form of the present invention illustrated in FIG. 4B is applicable to scenes extended over large angular field suitable for imaging scenes in a manner analogous to the bandpass form described above with reference to FIG. 4A. As should be apparent, spatial filter 420B is essentially the optically transmissive complement of spatial filter 420A.

It should be understood that the bandstop form of the present invention suitable for extended scenes as illustrated in FIG. 4B is analogous to the bandstop form for a single on-axis point source illustrated in FIG. 3B. Further, it should be understood that the bandstop form illustrated in FIG. 4B may be modified to provide superior rejection of a high intensity point source, such as a laser, located at any point in the extended multispectral scene 410, by addition of optical imaging components similarly functioning and arranged like well-corrected imaging optic 350 and sampling aperture 352 illustrated in FIG. 3C. However, like hybrid fore-optic 416 and reimaging optic 424, well-corrected imaging optic 350 for application with the bandstop form of the invention illustrated in FIG. 4B will need to be design to satisfy the requirements imposed by a wide angular field. Further, a sampling aperture 352 for application with the bandstop form of the invention illustrated in FIG. 4B will need to be design to also satisfy the requirements imposed by a wide angular field employed. Namely, a sampling aperture will need to comprise a two-dimensional array of apertures like aperture 354 of sampling aperture 352 to provide the intended function.

The modified form of FIG. 4B including large field of view well-corrected optics and sampling aperture will provide superior bandstop characteristics over a wide angular field—analogous to the bandstop form of the invention illustrated in FIG. 3C for a single on-axis multispectral point source.

Distortion Correction

It is well known to optical designers that the need to correct distortion frequently contributes significant complexity to the optical design of a system providing good image quality over a wide angular field. In the present invention distortion correction may be accomplished by proper design of the spatial filter 420A, 420B, interposed between the hybrid fore-optic 416 and the hybrid reimaging optic 424. More specifically, proper placement of the apertures of the two-dimensional array of apertures of spatial filters 420A and 420B is a simple scheme in the present invention to provide distortion correction, as compared with more complex techniques involving the detailed construction or design of hybrid fore-optic 416 and hybrid reimaging optic 424.

Both the design of the various forms of our invention and its individual components are within the capability of those well trained in optical design and the use of modern optical design tools. Because of the need for hybrid optics and the need to provide wide angular field, it is generally not possible to find simple analytical expressions or formulas to predict spectral filtering properties of a specific embodiment of the present invention. Such prediction of performance is, however, within the capability of those well trained in optical design with use of modern optical design tools, as will be illustrated below by two examples which follow.

Optical Components

Further details of the optical components illustrated in the Figures above will now be described. It should be recognized that the details of the optical components which follow are intended to be only exemplary, and modifications thereof are intended to be within the true spirit and scope of the present invention in order to achieve a desired performance by the practitioner.

In practice of the present invention, it is desired that the optical components employed have more or less the following properties:

1. Large longitudinal chromatic dispersion at an intermediate image plane,
2. Frequency independence of magnification in the intermediate image region, and
3. Frequency independence of point-source response size in the intermediate image region.

Figure 2A:
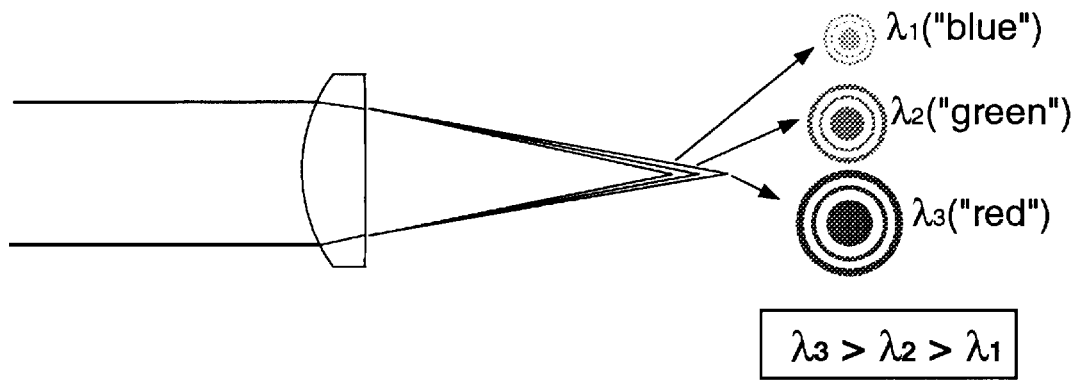
FIG. 2A is a diagram illustrating a conventional imaging optic well corrected for chromatic aberration commonly found in high quality imaging systems and not exhibiting longitudinal dispersion.
Figure 2B:
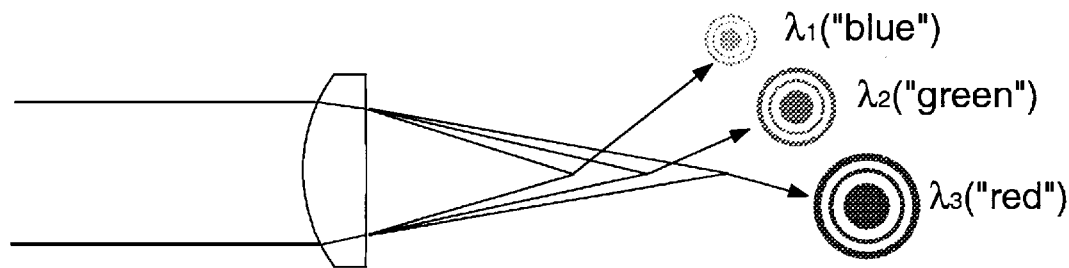
FIGS. 2B and 2C are diagrams illustrating longitudinal dispersion of a refractive optic and a diffractive optic, respectively.
Figure 2C:
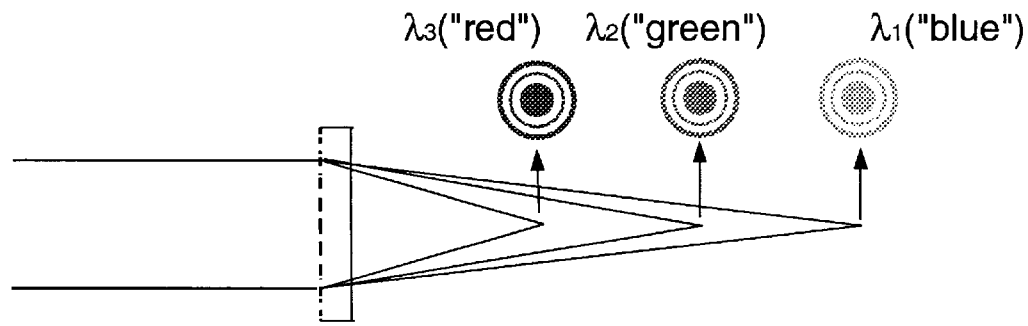

As is well understood, a large amount of longitudinal chromatic dispersion into a lens system causes the image to be spread out longitudinally in frequency along the optical axis. The longitudinal wavelength spread of a diffractive element is an order of magnitude greater than that of a refractive element, as illustrated in FIG. 2C. However, a single diffractive element generally cannot provide high image quality over a wide angular field, and thus a hybrid approach generally should be employed to achieve the first property.

The second property, frequency independence of magnification, may be fulfilled both by making the hybrid fore-optic substantially telecentric and by minimizing lateral chromatic aberration. With a substantially telecentric hybrid fore-optic having minimal lateral chromatic aberration, all images in a broad spectral waveband have identical magnification, or size, in spite of being displaced axially, and may have good quality over a large angular field.

For achieving the third property, a two-dimensional spatial filter array having apertures with size related to the point source image radiance distribution size may be used to select a given waveband at the intermediate image plane. This is strictly true only for a purely diffractive element for an on-axis point source at infinity, but it may be substantially realized for a hybrid optical system.

Hybrid Fore-Optic

A hybrid fore-optic having the above three properties may be achieved by employment of a substantially telecentric hybrid optic consisting of a conventional optic assembly and one or more diffractive elements. In the preferred embodiment of the invention, the diffractive element should be located near the conventional lens system's focal point, and form the aperture stop of the lens system (telecentric condition). A hybrid fore-optic of the present invention thus may be thus implemented as a hybrid optical system. Being coincident with the aperture stop, the diffractive element will introduce no lateral chromatic aberration, thus eliminating this aberration as a source of image quality degradation.

Figure 5:
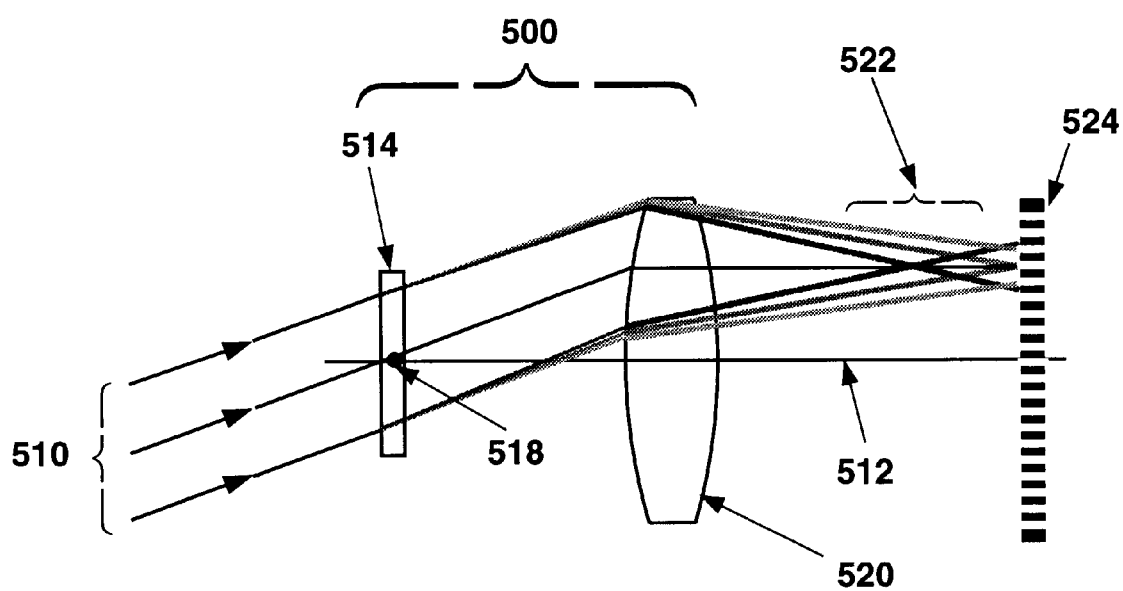
FIG. 5 is a schematic diagram of one embodiment of a hybrid fore-optic module illustrated in FIG. 3A.

Illustrated in FIG. 5 is a schematic diagram of an exemplary embodiment of hybrid fore-optic 416 and optical ray diagram. As illustrated in FIG. 5, the exemplary hybrid fore-optic is designated by numeral 500 and includes a diffractive optic element or means 514, and an optic lens module 520. Rays from a multispectral off-axis field point 510 are illustrated to emphasize the telecentric condition. Diffractive optical element 514 is placed substantially at focal point 518 of fore-optic lens module 520. Making aperture stop of the composite hybrid optic to occur at diffractive optical element 514 enforces the telecentric condition on the entire hybrid fore-optic arrangement. As shown in FIG. 5, the chief ray at any frequency is incident normally on spatial filter 524, the same as spatial filter 420A, or 420B. Thus, in this embodiment there is no substantial lateral chromatic aberration for any field point, ensuring both good image quality for wide angular fields and an absence of magnification dependence on spectral frequency.

Further, with embodiment of FIG. 5, there is substantial longitudinal chromatic dispersion introduced by diffractive element 514 in intermediate image region 522, and all frequencies come to sharp focus along an axis parallel to optical axis 512. This fact enables the use of spatial filter 524 with apertures related in size to the focus blur distribution to select a specific spectral waveband in the image region formed by hybrid fore-optic. Although the third property above may not have strict compliance thereto, there are sufficient design degrees of freedom in a hybrid system to attain a large degree of frequency independence of point source distribution size to enable realization and implementation of a practical spectral filter, as will be shown by example below.

Lens module 520 of FIG. 5 may consist of an assembly of refractive elements, reflective elements, and diffractive elements as needed to provide required image quality over a desired angular field for a specific application or design. Thus, lens module 520 may itself be a hybrid optic containing one or more diffractive elements, but in this case diffractive elements serve to correct optical aberrations, such as spherical aberration, field curvature, distortion, or chromatic aberration arising from dispersion in refractive index, in a manner well known to those familiar with modern optical design methods. (It should be noted that achievement of the above three stated three optical properties is unlikely with a single diffractive element.)

A variety of methods to fabricate diffractive elements are available, of course, including, among others, single point diamond machining, laser writers, direct-write electron beam lithography, ultraviolet lithography and dry etch micromachining, and x-ray lithography. A variety of replication methods may also be used to manufacture diffractive elements inexpensively in large numbers, including injection molding, cast-and-cure, and surface embossing. A survey of the state of the art in diffractive optics may be found in the book by S. H. Lee, Diffractive and Miniaturized Optics.

Hybrid Reimaging Optic

The hybrid reimaging optic component 424, 324, of the present invention performs the function of relaying the spectral image passed through the spatial filter component (420A,B 316A,B) to the output image detector (326, 428). Therefore, the hybrid reimaging optic must "undo" the longitudinal dispersion created by the hybrid fore-optic and create a sharp final image at the output image detector for each spectral band. As with the hybrid fore-optic, the hybrid reimaging optic desirably forms a final or output image with no lateral chromatic aberration for each field point in the angular field of the system.

Figure 6A:
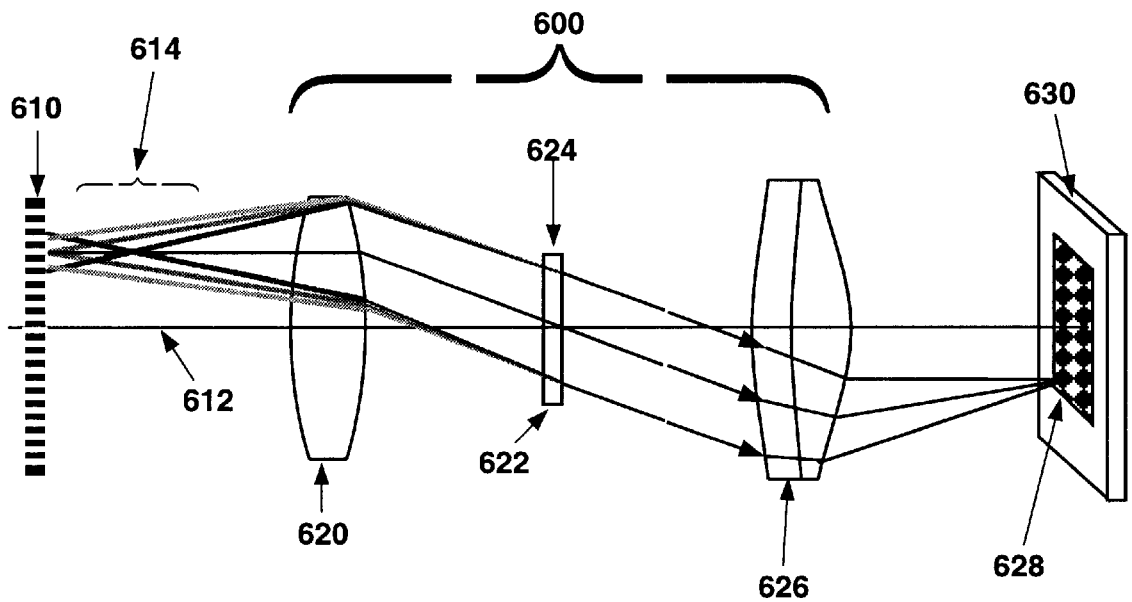
FIG. 6A is a schematic diagram of one embodiment of a hybrid reimaging optic module of FIG. 3A for obtaining an achromatic image in focused form for detection of a two-dimensional output image detector.
Figure 6B:
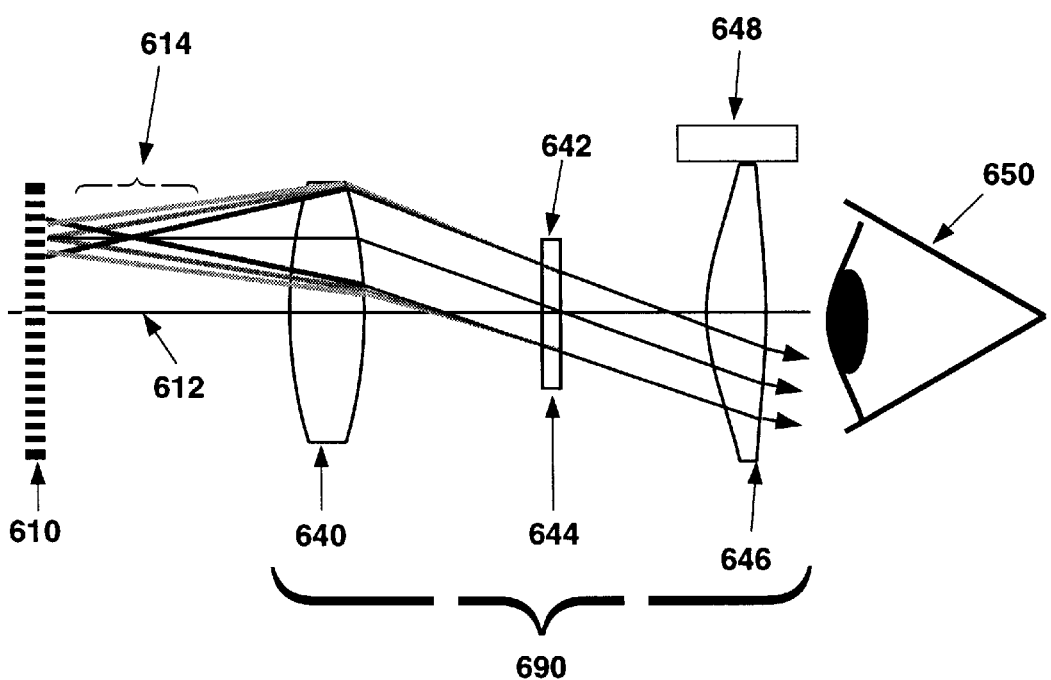
FIG. 6B is a schematic diagram of one embodiment of a hybrid reimaging optic module of FIG. 3A for obtaining an achromatic image in substantially collimated form for an observer's eye.

Illustrated in FIG. 6A and FIG. 6B are schematic diagrams of exemplary embodiments of hybrid reimaging optic 416 and corresponding optical ray diagrams. Each of these Figures shows an optical system, designated numeral 600, comprised of (i) a first optic lens module, 620, 640, (ii) a diffractive element, 622, 642 located substantially at a pupil location 624, 644, respectively, and (iii) a second optics lens module, 626, 646.

FIG. 6A shows the main features of an exemplary embodiment for a hybrid reimaging optic 424 for forming a two dimensional image intended to be detected by a two dimensional output image detector 630 as opposed to simply an observer's eye as illustrated in FIG. 6B. In FIG. 6A, output image detector 630 may be a two-dimensional array of photodetectors, photographic film, or an image intensifier tube. Output image detector 630 is intended to be placed at final image 628 formed by the hybrid reimaging optic. In this instance, hybrid reimaging optic 600 relays each spectral image passed through spatial filter 610, same as spatial filter 316,420, to output image detector 630. Rays from an off-axis multispectral field point are illustrated in a manner similar to FIG. 5.

Spatial filter 610 as illustrated in FIG. 6A is intended to be located in intermediate image region 614 to select a specific spectral waveband. Optics lens module 620, diffractive element 622, and optics lens module 626 together collect the dispersed radiation passed by spatial filter 610 and forms an image, well-corrected at all frequencies in a broad waveband, at output image detector 630.

In the case that output image detector 630 is a two-dimensional array of discrete electronic photodetectors, optimal performance is achieved by designing the hybrid reimaging optic 600 to map each aperture in spatial filter 610 onto the active region in a corresponding discrete photo detector of output image detector 630.

FIG. 6B illustrates an exemplary embodiment for a hybrid reimaging optic 690 suitable for direct viewing by an observer. In this case, the entire hybrid reimaging optic 690 is better characterized as an eyepiece, consisting generally of optics lens module 640, diffractive element 642, and optics lens module 646, which provides a substantially collimated spectral image to observer 650. Adjusting means 648 may be included for fine positioning of optics lens module 646 to permit observer 650 to accommodate the spectral image to his own eye.

Diffractive element 622 or 642 of hybrid reimaging optic 600 and 690, respectively, should have dispersive properties opposite to those in diffractive element 514 in a companion hybrid fore-optic. Thus, if diffractive element 514 of a hybrid fore-optic 500 has positive optical power with large diffraction efficiency in a positive diffractive order, then diffractive element 622, 642 in a hybrid reimaging optic should generally have negative optical power with large diffraction efficiency in a negative diffractive order. Moreover, lateral chromatic aberration in hybrid reimaging optic is avoided by placing diffractive optic 622, 642 substantially at intermediate pupil location 624, 644.

As is well known to those familiar with optical design, pupil location 624, 644 is the image of aperture stop 516 in FIG. 5 formed by all intervening optical elements, consisting primarily of fore-optic lens module 520 and relay optic lens module 620, 640. In this manner, it is possible to achieve a well-corrected final image at output image detector 628 for each spectral frequency at every point in the angular field of the system.

As with fore-optic lens module 520 of hybrid fore-optic 500, both optic lens modules of the hybrid reimaging optic of FIG. 6A or eyepiece of FIG. 6B (620 and 626, and 640 and 646, respectively) may consist of an assembly of refractive elements, reflective elements, and diffractive elements as needed to provide required image quality over a desired angular field for a specific application or design. Thus, any of the optic lens modules of the hybrid reimaging optic or an eyepiece may itself be a hybrid optic containing one or more diffractive elements which similarly serve to correct optical aberrations.

The hybrid reimaging optic forms illustrated in FIGS. 6A and 6B are representative, and are not intended to convey uniqueness in form. Preferably, hybrid reimaging optic 600, 690 should have diffractive element 622 or 644 substantially near a pupil position and one other optics lens assembly. The use of both optics lens modules (620 and 626 in FIG. 6A, or 640 and 646 in FIG. 6B) is not required, but at least one optics lens module needs to be used.

Figure 7:
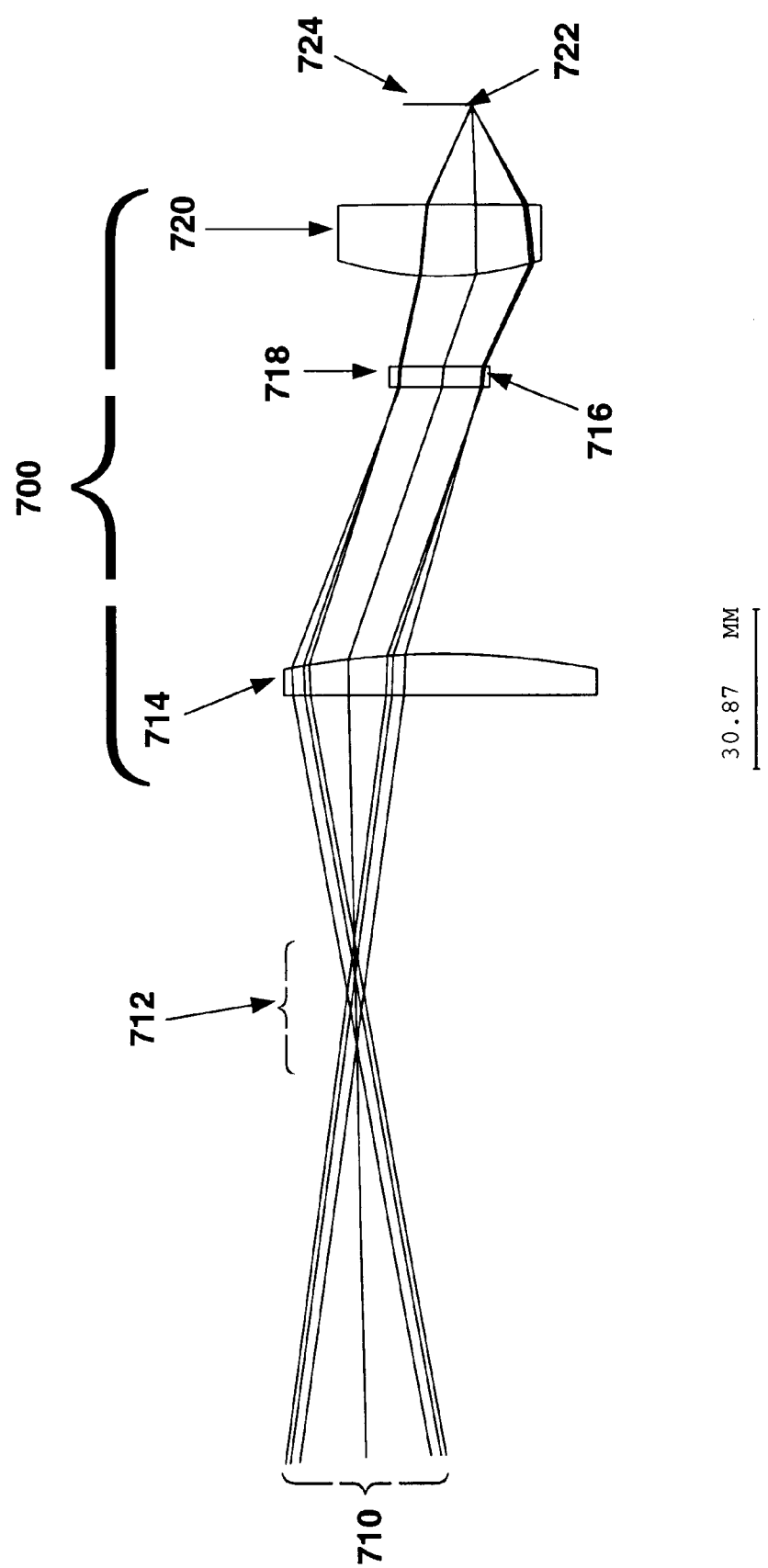
FIG. 7 is a schematic diagram of one embodiment of a hybrid reimaging optic module of FIG. 3A for obtaining for an infrared spectral imaging application.

FIG. 7 illustrates an exemplary design of a hybrid reimaging optic 700 for an infrared imaging application and corresponding ray diagram. As illustrated, diffractive element 716 is placed at intermediate pupil location 718. This design explicitly demonstrates feasibility of restoring spectrally dispersed images of multispectral rays from multispectral off-axis point source 710 formed in intermediate image region 712 by hybrid fore-optic (not shown) as a well-corrected final image 722 at output image detector 724. In this particular example, diffractive element 716 possesses negative dispersion with maximum diffraction efficiency in −1 diffractive order. Thereshown are optics lens module 714 and 720 which each may be formed by a single germanium lens having spherical surfaces, but in designs with more stressing requirements, these modules may contain aspheric surfaces and other diffractive elements.

Spatial Filter

Referring to FIG. 4A for the bandpass form and FIG. 4B for the bandstop form of the present invention, the function of spatial filter 420A or 420B is to sample the intermediate image of extended multispectral scene 410 formed by hybrid fore-optic 416, and to pass or reject frequencies in a spectral band which are brought to focus by hybrid fore-optic 416. Coverage of a finite angular field subtended by extended multispectral scene 410 is achieved by implementing spatial filter 420A and 420B as a two-dimensional array of apertures.

Spatial filter 420A may be formed by an array of transmitting apertures in a nontransmissive screen or substrate as aforesaid. A bandstop form of our invention may be constructed by making spatial filter 420B an array of nontransmitting apertures in a transmissive screen or substrate, as aforesaid. It should be noted that there are several methods well-known to fabricate such spatial filters, and our invention is not limited by a specific fabrication means. For example, one method is to choose a substrate with high transmittance at all frequencies in a broad spectral band of interest, apply to the substrate by vacuum deposition a metallic film of sufficient thickness to reflect substantially all frequencies in the waveband of interest, lithographically pattern the regions requiring high transmittance, and selectively etch away the metal in the patterned regions. A bandpass form may also be fabricated as an array of holes drilled, for example by a high intensity laser, into a thin metal sheet.

Because the spatial filter can be implemented on a thin substrate having low mass, the time required for translation means 430 to selectively position spatial filter 420A, 420B along optical axis 412 in intermediate image region 422 can be quite small. Response times on the order of one millisecond may be achievable with some designs. Thus, it is possible to change the center frequency of a spectral band very quickly. This feature may be used to achieve an effectively larger spectral bandwidth by causing the spatial filter to oscillate through a region of intermediate image region 422 corresponding to the larger spectral band during an integration time interval of output image detector 428.

Figure 8:
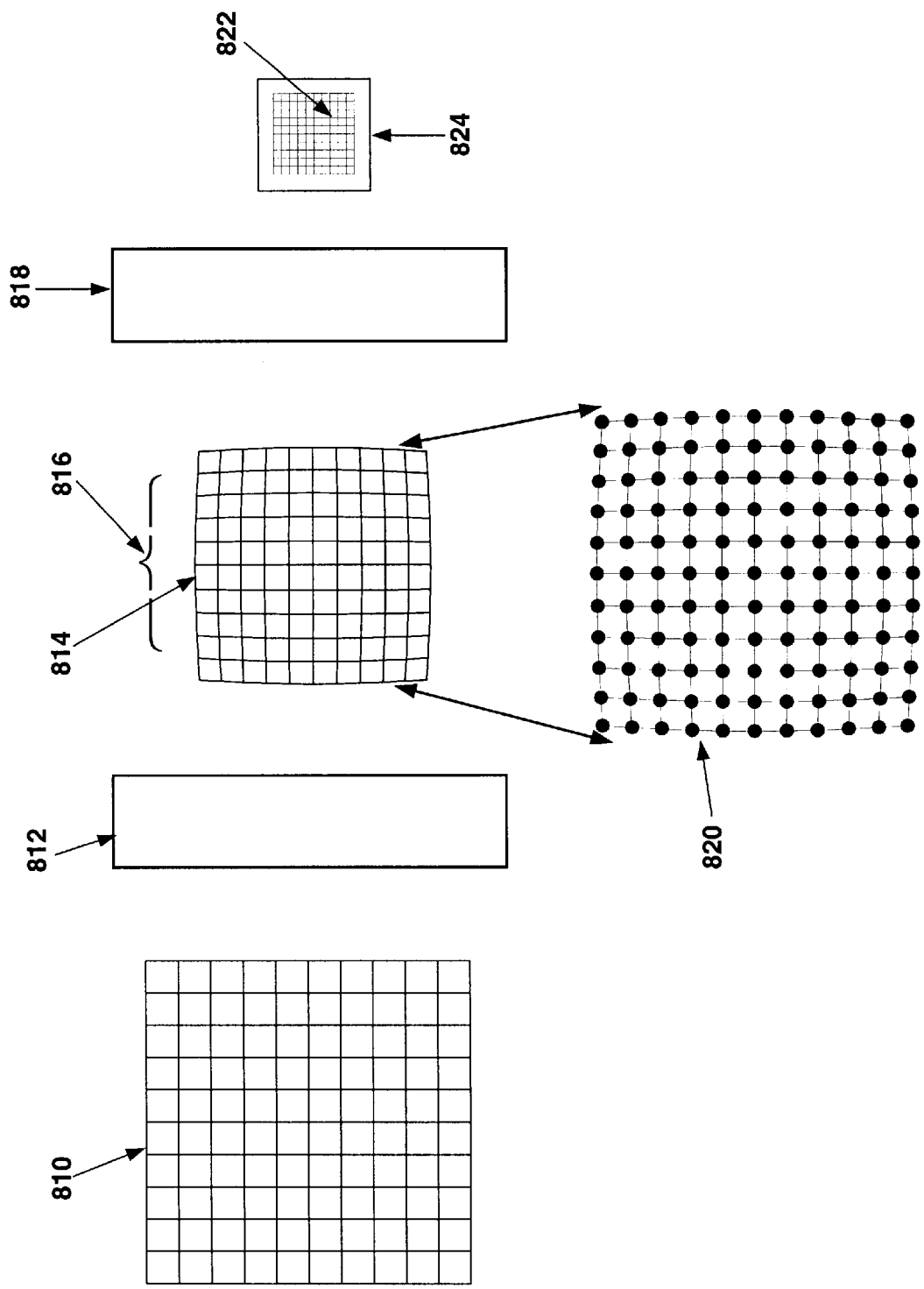
FIG. 8 is illustration depicting image distortion and one embodiment of a spatial filter in accordance with the present invention.

The spacing of apertures associated with the two-dimensional array in the spatial filter does not have to be uniform or periodic. If distortion is present in the optical components, it can be compensated or corrected by the distribution of apertures in the spatial filter, and thus can cause simplification of the optical components. FIG. 8 illustrates how distortion correction can be incorporated into spatial filter 420A and spatial filter 420B, although for clarity only a spatial filter for a bandstop form is shown in FIG. 8.

Referring to FIG. 8, uniform grid 810 comprises an extended object in a scene, and distorted image 814 is formed in intermediate image region 816 by hybrid fore-optic 812, similar hybrid fore-optic 416, and relayed by hybrid reimaging optic 818, similar to hybrid reimaging optic 424. If spatial filter 820 consists of a uniformly distributed array of apertures, then distorted image 814 would be relayed to output image detector 824 with perhaps additional distortion. Causing the aperture array in spatial filter 820 to be distributed according to the composite distortion map of hybrid fore-optic 812 and hybrid reimaging optic 818 provides a final undistorted image 822 at output image detector 822.

Translation Means

In FIG. 4 the function of translation means 430 is to position spatial filter 420A, 420B along optical axis 412 in intermediate image region 422 in order to select a specified spectral image of extended multispectral scene 410. The precision and accuracy of placement required is determined by spectral selectivity requirements for each application and can be calculated and predicted by those skilled in the use of modern optical design tools.

It is possible to establish a correspondence or relationship between position of spatial filter 420A, 420B along optical axis 412 and central spectral frequency of spectral waveband passed by the spatial filter at that position. Such relationship may be found either with the optical design tools mentioned above or by measurement. Translation means 430 may be provided by an actuation means to move spatial filter 420A, 420B along optical axis 412, a means to determine location of the spatial filter along the optical axis, and a control means to select a spectral waveband using the known correspondence or relationship between position and frequency.

In general, translation means 430 should be designed to minimize lateral motion of spatial filter 420A, 420B. In the event that output image detector 428 is an array of photo detectors, each aperture in spatial filter 420A, 420B will be imaged onto one corresponding photodetector, and lateral motion of spatial filter 420A, 420B must be limited to a small fraction of the distance between two neighboring apertures. Translation means 430 may be provided by a wide array of techniques for achieving the intended function and therefore is not described in detail herein. However, actuation and drive techniques which may be employed in the practice of the present invention include, among others, piezoelectric drives, micrometer screw driven either manually or by motor, magnetic drives, electromagnetic actuators, or a variety of mechanical means. There are also many techniques well known for sensing or determining longitudinal position of spatial filter 420A, 420B along optical axis 412 and therefore details thereof have been omitted herein. Finally, control and servo methods and techniques are well known to permit automated selection of spectral wavebands to be imaged on output image detector 428 with feedback signals obtained from the output image detector.

Figure 9:
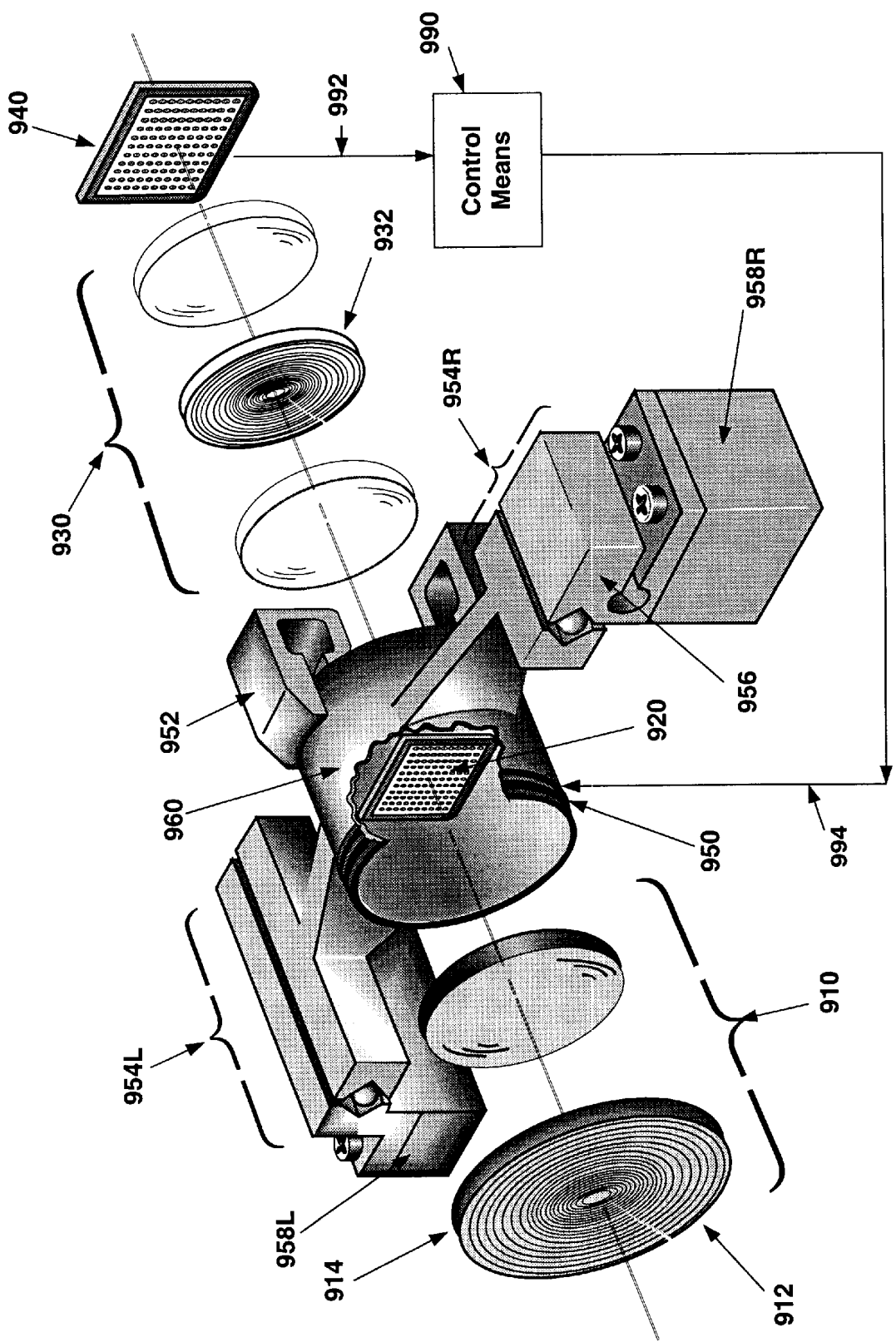
FIG. 9 illustrates a perspective view of an imaging system in accordance with present invention.

FIG. 9 illustrates a perspective view of an exemplary electromechanical embodiment of the present invention employing a translation means 430 illustrated as an electromagnetic drive with a kinematic slide assembly. Diffractive optic 912, contained within hybrid fore-optic 910, forms the aperture stop 914 of the entire optical system. Diffractive optic 932, contained within hybrid reimaging optic 930, is located substantially at an intermediate pupil position. Spatial filter 920 is fixed within housing 960. The translation means (430) is comprised of housing 960 integrated in two three-ball kinematic slide assemblies, 954L and 954R, supporting mounts 958L and 958R, electromagnetic driver 950, and permanent magnet 952. Electromagnetic driver 950 is of the voice coil type commonly used as a focusing actuator in other optical systems and can implement rapid movement of spatial filter 920 over several millimeters distance. Three-ball kinematic slide assembly 954L, 954R incorporates ball preload flexure 956 to limit lateral motion of housing 960 to less than one micrometer.

Further illustrated in FIG. 9 is a control means 990 responsive to an output signal representation 992 of output image detector 940 for producing a command signal 994 as an input to translation means shown as electromagnetic driver 950. Control means 990 may be implemented by a wide variety of feedback control systems for spatially positioning optical spatial filter 920 to a desired location for forming an output image formed by hybrid reimaging optic 930 having selected spectral properties as already described, functioning as a bandpass or bandstop tunable multispectral optical filter.

Electromagnetic drives are available which may provide response times of less than two milliseconds. Application of electrical current to electromagnetic driver 950, i.e., command signal 994, induces by interaction with permanent magnet 952 a longitudinal component of force on housing 960, which is caused to move spatial filter 920 to a position on the optical axis where a specified spectral band is brought to focus by hybrid fore-optic 910. Control means 990 may be utilized to accurately place spatial filter 920 along the optical axis in association with a specified spectral frequency.

Exemplary Construction—Bandpass Form

Figures 10A, 10B:
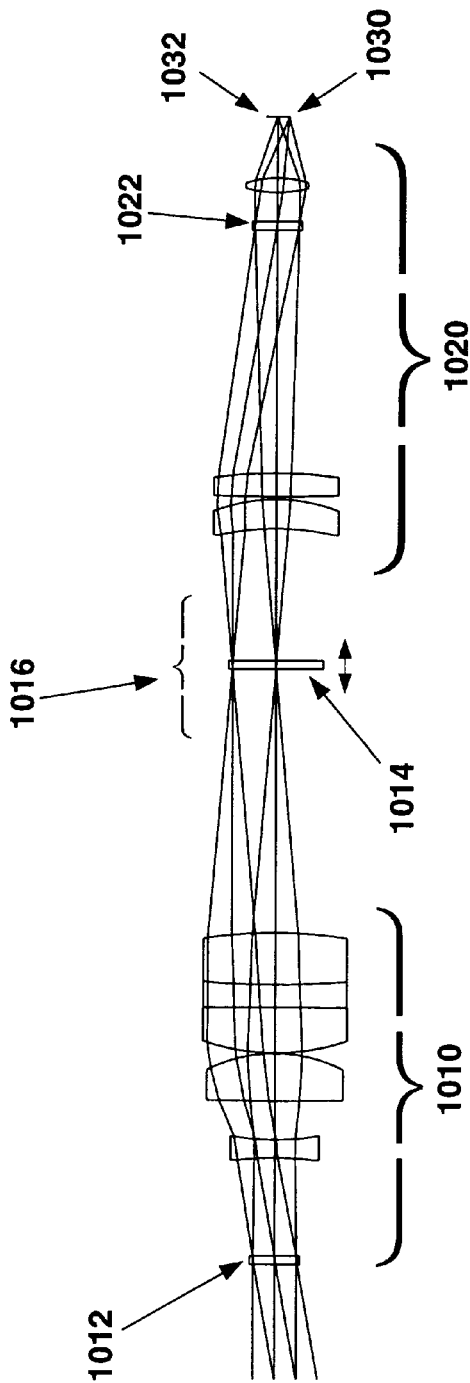
FIG. 10A illustrates a schematic diagram of an optical component arrangement for the bandpass form of the present invention, suitable for broad visible waveband operation.
FIG. 10B is a table of exemplary parameter values of the optical system of FIG. 10A.

A design of a prototype bandpass tunable multispectral filter for use in the visible waveband is shown in FIG. 10A, with a table of exemplary design parameters illustrated in FIG. 10B. This design is made up of spherical elements using standard optical glasses. Design and performance of this system was performed with a commercially available optical tool (Code V™). Hybrid fore-optic 1010 consists of five glass lenses with diffractive element 1012 located at a front focal point and comprises the system aperture stop, thus forming a telecentric fore-optic. Spatial filter 1014 consists of an array of 700×700 pinhole apertures spanning 30 mm×30 mm. The total pinhole aperture area constitutes nine percent of the total area of the spatial filter (900 mm$^2$). Hybrid fore-optic 1012 provides an angular field of twenty degrees and disperses an image spectrally over 5 mm along the optical axis in intermediate image region 1016. Diffractive element 1012 has positive diffractive power. Hybrid reimaging optic 1020 a spectral image passed by spatial filter 1014 to CCD detector array 1032 located at final image plane 1030. CCD detector array 1032 has 700×700 detector elements, spans an area of 8 mm×8 mm, and the active sensing area of each detector is thirty percent of the total detector area. Diffractive element 1022 has negative diffractive power.

Figure 11:
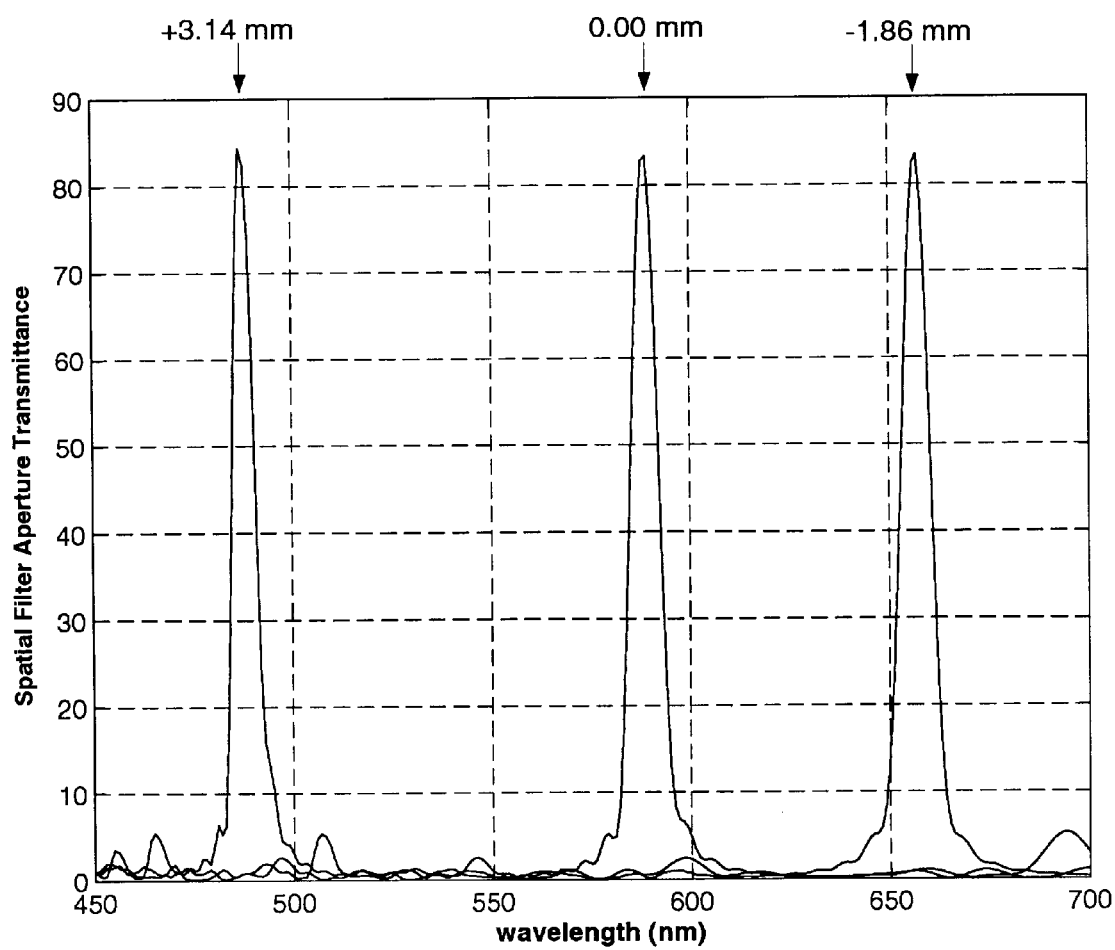
FIG. 11 is a graphical representation of predicted spectral filter characteristics of the imaging means of FIG. 10, tuned to three representative wavelengths.

The transmission function of the spatial filter aperture array can be predicted with the same optical design tool, and an example for the system tuned to three wavelengths is shown in FIG. 11. The out-of-band spectral transmittance, representing leakage, approaches the area fill factor of the transmitting aperture for wavelengths which are far out-of-band. The width of the spectral transmission function is related to the design's longitudinal waveband spread at the transmitting aperture array and the transmitting aperture fill factor. These parameters can be adjusted to give the desired ratio of out-of-band energy to inband energy at the image plane detector. As an example, this design gives a bandwidth of approximately 20 nm measured at 10 percent transmittance when tuned to 580 nm. The ratio of inband to out-of-band energy is 5.40. The inband transmittance compared to an ideal rectangle function is 0.56. In practice, there is always some variation of blur diameter with wavelength in a hybrid system, leading to some variation in the filter's spectral bandpass characteristics with center wavelength as shown in FIG. 11. Relative longitudinal position of spatial filter 1014 along the optical axis in intermediate image region 1016 is shown at the top of FIG. 11. The entire spectral waveband is covered in this design with a total distance of 5 mm along the optical axis.

Exemplary Construction—Bandstop Form

Figure 12:
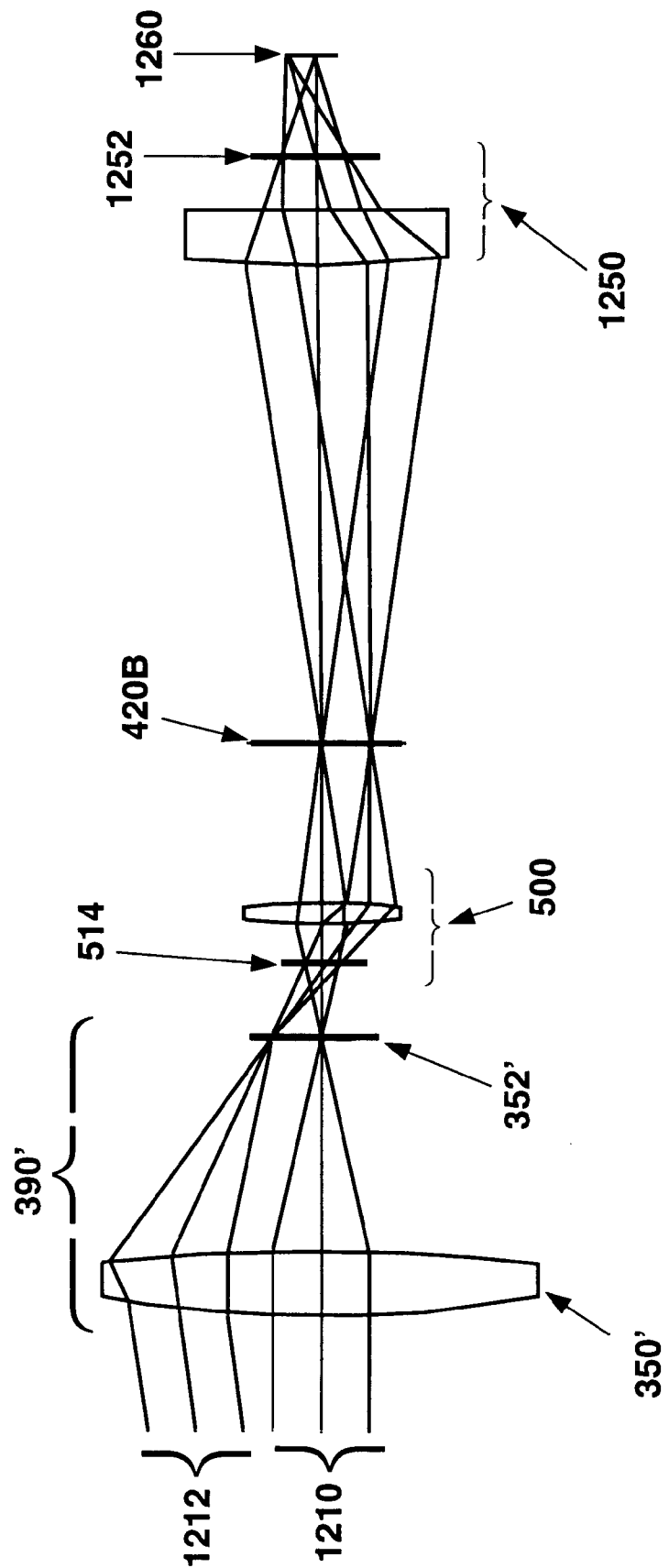
FIG. 12 illustrates a schematic diagram of an optical component arrangement, in the bandstop form of the present invention, suitable for broad visible waveband operation.

A preliminary design and performance prediction have been done for the bandstop form with improved rejection capability (refer to FIG. 3C). The optical design tool CodeV™ was also used for this example. FIG. 12 illustrates the main components and layout of the design. Rays are traced through the system for multispectral on-axis field point 1210 and multispectral off-axis field point 1212. The "perfect lens module" capability of CodeV™ was used for well-corrected imaging optic 350' and the conventional optical components of hybrid fore-optic 500 (similar to that shown in FIG. 5) and hybrid reimaging optic 1250. Diffractive element 514' at aperture stop 1234 and diffractive element 1252 were modeled as separate components.

Figure 13A:
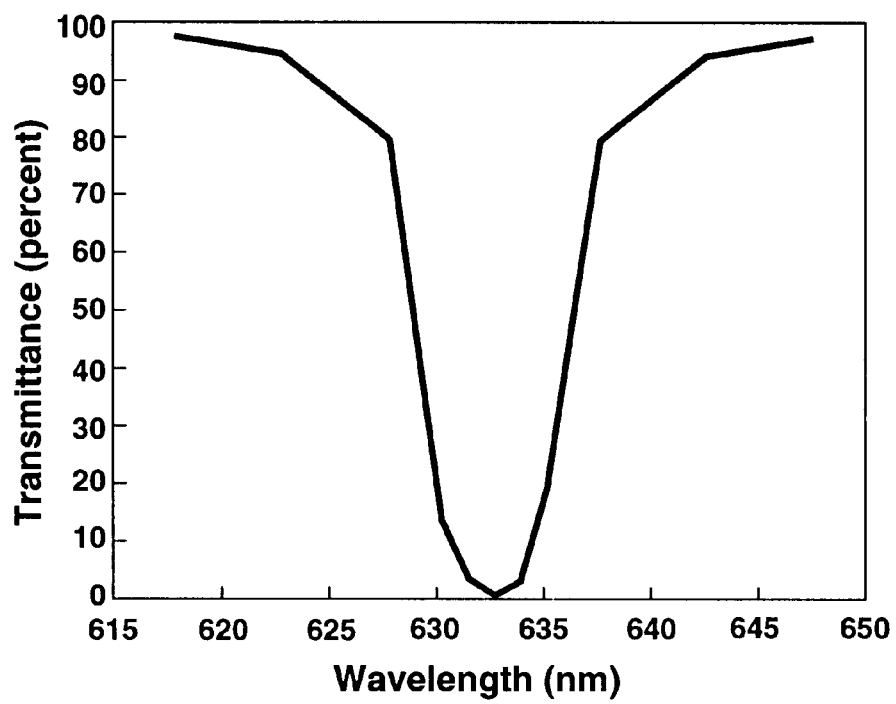
FIGS. 13A and 13B is a graphical representation of predicted spectral filter characteristics of the imaging means of FIG. 12, tuned to two representative wavelengths.
Figure 13B:
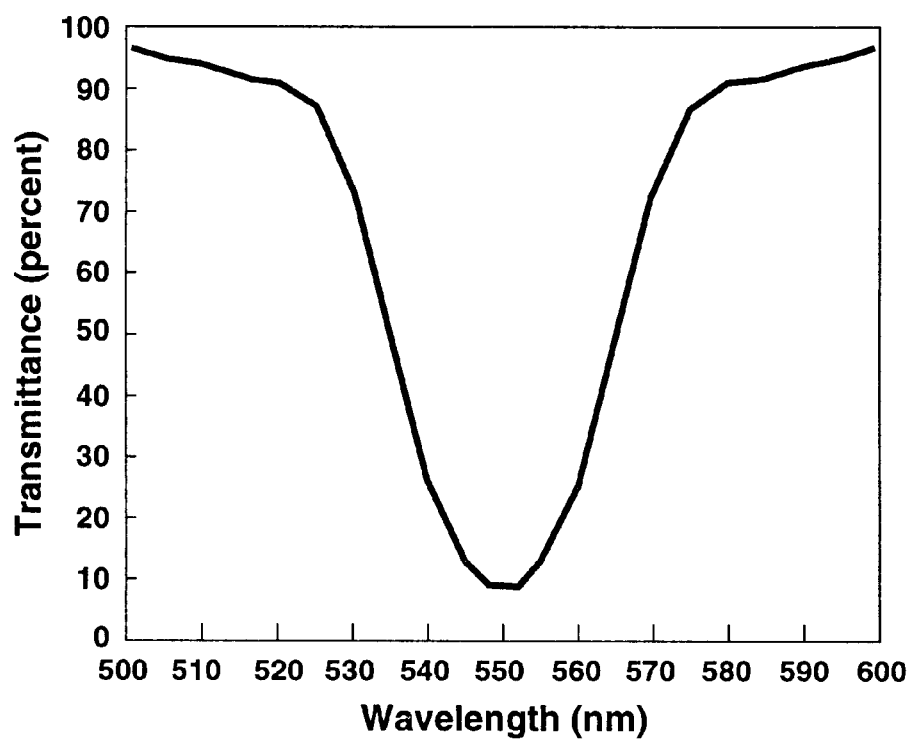
Figure 14:
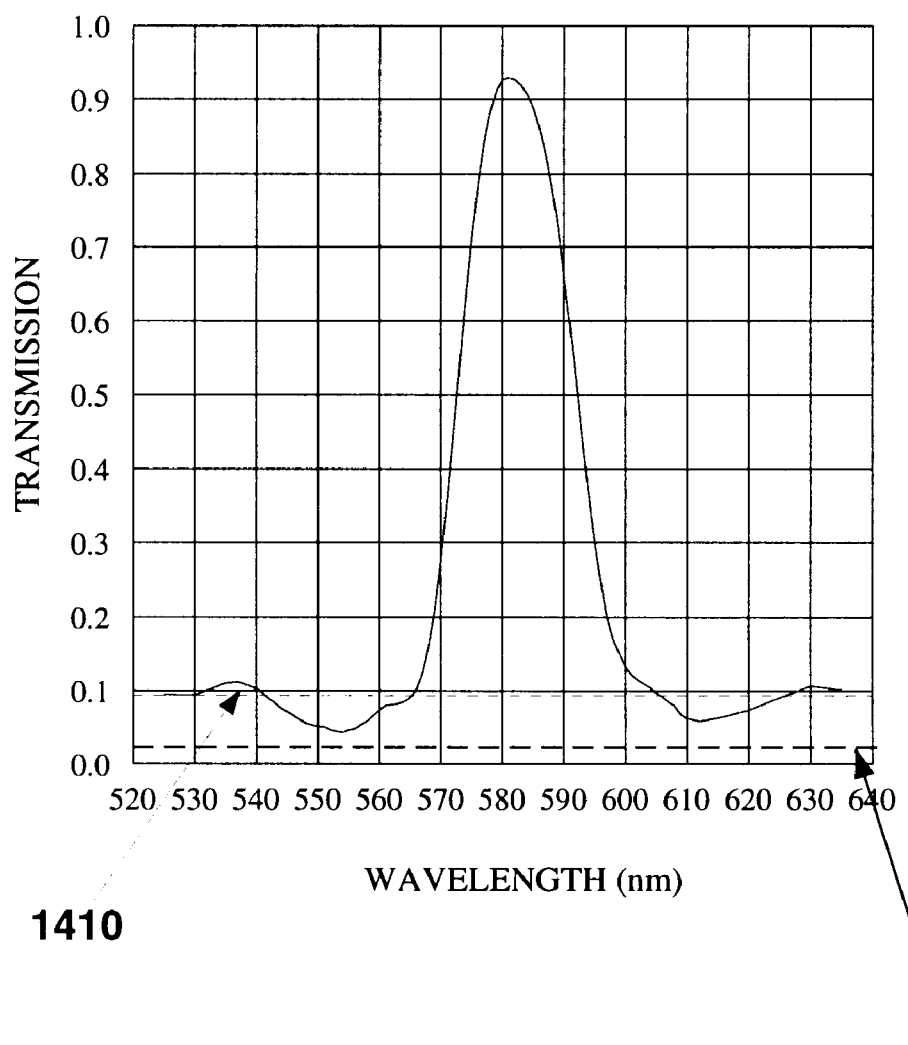
FIG. 14 is a graphical representation of further spectral filter characteristic of the present invention.

The design pertains to the visible spectral waveband. Well-corrected imaging optic 350' (similar to well-corrected optic 350 illustrated in FIG. 3C) has a focal length of 100 mm, a focal ratio of F/4, and an angular field of ten degrees. Sampling aperture 352' (like sampling aperture 352 of FIG. 3C) consists of a 256×256 array of transmitting apertures arranged on a square grid with a pitch of 68 μm. Each aperture has a diameter of 34 μm, giving an area fill factor of 25 percent. Following sampling aperture 352' is hybrid fore-optic 500 which relays a spectral component of sampling aperture 352' to spatial filter 420B. Hybrid fore-optic 500 is made telecentric by placing diffractive element 514 at a focal point of the remaining components of hybrid fore-optic 500 and making diffractive element 514' the aperture stop 1234 of the entire system. Diffractive element 514' has a diameter of 7.4 mm, a minimum Fresnel zone width of 20 μm. Spatial filter 420B consists of a 256×256 array of blocking apertures on a transparent glass substrate. The pitch of the blocking apertures is approximately 95 μm. As can be seen by the ray traces in FIG. 12, both the on-axis and off-axis field points come to focus with central rays normal to spatial filter 420B. Since diffractive element 514' is located at aperture stop 1234, only longitudinal chromatic dispersion is generated; for this specific design the visible spectrum is spread over 5 mm in the intermediate image region containing spatial filter 420B. Hybrid reimaging optic 1250 recombines longitudinally dispersed light and image the filtered scene onto final image 1260 where it is sensed by a 256×256 CCD detector array (not shown). Hybrid reimaging optic 1250 consists of a conventional lens module with focal length of 93 mm and a diffractive element having diameter of 34 mm and minimum Fresnel zone width of 100 μm. Detectors in the CCD array have a pitch of 50 μm and a fill factor of 25 percent. FIG. 13 shows predicted performance of this bandstop design tuned to wavelengths of 633 nm and 550 nm.

Variations

The present invention has been described by way of the accompanying figures to illustrate the present invention, however other modification thereto are of course possible, all of which are intended to be within the true spirit and scope of the present invention. It will be apparent to those skilled in the art that various details may be altered to achieve the intended function of the tunable multispectral optical filter and imaging apparatus without departing from the true spirit and scope of the present invention. More specifically, there are may arrangements and types of optical components to achieve a hybrid fore-optic and hybrid reimaging optic, diffractive optic, as well as design choice for an output image detector, optical spatial filters, and cooperating translation means without departing from the true spirit and scope of the present invention.

We claim:

1. A tunable multispectral optical apparatus for forming a spectrally processed image of a scene containing multispectral components, said tunable multispectral optical apparatus comprising:

a hybrid fore-optic means, having a fore-optic optical axis and a fore-optic focal point associated therewith, for forming an intermediate image on an image side of said hybrid fore-optic means in response to light rays emanating from said scene and impinging upon an object side of said hybrid fore-optic means, opposite said image side, and wherein said hybrid fore-optic means includes at least one diffractive optical element positioned substantially at said fore-optic focal point;

hybrid reimaging optic means, having a rear-optic optical axis and a rear-optic pupil associated therewith, for forming an output image derived from said intermediate image, and wherein said hybrid rear-optic means includes at least one diffractive optical element positioned substantially at said rear-optic pupil; and optical spatial filter means for intercepting at least a portion of said intermediate image, said spatial filter means selectively configured and selectively positioned between said hybrid fore-optic means and said hybrid reimaging optic means such that said output image includes only selected ones of said multispectral components of said scene.

2. The apparatus of claim 1 further including:

well-corrected optic means interposed between said scene and said hybrid fore-optic for forming a well-corrected optical image; and sampling filter means interposed between said well-corrected optic means and said hybrid fore-optic means for intercepting said well-corrected image before impinging upon said hybrid fore-optic means.

3. The tunable multispectral optical apparatus of claim 1 further comprising:

translation means for spatially positioning said optical spatial filter means between said hybrid fore-optic means and said hybrid reimaging optical means in response to a command signal;

output image detector means for intercepting said output image and converting said output image into an electrical signal representation of said output image; and control means responsive to said electrical signal representation of said output image for providing said command signal such that said optical spatial filter means is spatially positioned at an intermediate image plane of a selected spectral component of said intermediate image formed by said hybrid fore-optic means.

4. The tunable multispectral optical apparatus of claim 1 further comprising means for spatially positioning said optical spatial filter means between said hybrid fore-optic means and said hybrid reimaging optic means at an intermediate image plane of a selected spectral component of said intermediate image formed by said hybrid fore-optic means.

5. A tunable multispectral optical apparatus for forming a spectrally processed image of a scene containing multispectral components, said tunable multispectral optical apparatus comprising:

a first optical means, having a fore-optic optical axis and a fore-optic focal point associated therewith, said fore-optic optical axis passing through an object side and an oppositely opposed image side of said first optical means, said first optical means arranged for receiving light rays emanating from said scene and impinging on said object side, and forming an intermediate image of said scene on said image side of said first optical means and in a volume containing said fore-optic optical axis such that there exists an image plane associated with each spectral component of said intermediate image dispersed longitudinally along said first optical axis, and wherein said first optical means includes at least one diffractive optical element positioned substantially at said fore-optic focal point;

a second optical means, having a rear-optic optical axis and a rear-optic pupil associated therewith, and wherein said rear-optic optical axis is optically aligned with said fore-optic optical axis, said second optical means spatially separated from said first optical means and in the optical path of said intermediate image for forming an output image at a fixed image plane perpendicular to said rear-optic optical axis, and wherein said second optical means includes at least one diffractive optical element substantially positioned at said rear-optic pupil; and optical spatial filter means selectively configured and selectively positioned between said first and second optical means for intercepting at least a portion of said intermediate image, and selectively passing and blocking light rays associated with said intermediate image before impinging upon said second optical means so that said output image includes only selected ones of said multispectral components of said scene.

6. The tunable multispectral optical apparatus of claim 5 further comprising means for spatially positioning said optical spatial filter means between said first and second optical means at an intermediate image plane of a selected spectral component of said intermediate image formed by said first optical means.

7. The tunable multispectral optical apparatus of claim 5 further comprising output image detector means for intercepting said output image and converting said output image into an electrical signal representation of said second image.

8. The tunable multispectral optical apparatus of claim 7 further comprising control means responsive to said electrical signal representation of said output image for controlling the position of said optical spatial filter means so as to form said output image having said selected ones of said multispectral spectral components in focus.

9. The tunable multispectral optical apparatus of claim 5 further comprising image recording means for intercepting said output image and recording said output image as a photographic reproduction thereof.

10. The tunable multispectral optical apparatus of claim 5 wherein said first optical means successively includes:

said first diffractive optical element having said light rays emanating from said scene impinging thereon; and optical means for intercepting light rays emanating from said diffractive optical element.

11. The tunable multispectral optical apparatus of claim 5 wherein:

said at least one diffractive optical element of said first optical means is constructed to form a limiting aperture of said tunable multispectral optical apparatus.

12. The tunable multispectral optical apparatus of claim 5 wherein said second optical means forms said output image as substantially collimated light rays so as to be capable of being viewed by an eye of an observer.

13. The tunable multispectral optical apparatus of claim 5 wherein said optical spatial filter means is substantially an optically non-transmissive medium having a planar array of optically transmissive apertures separated by optically non-transmissive regions.

14. The tunable multispectral optical apparatus of claim 5 wherein said optical spatial filter is substantially an optically transmissive medium having a planar array of light blocking aperture regions separated by optically transmissive regions.

15. The tunable multispectral optical apparatus of claim 5 further comprising image enhancement means interposed between said scene to be viewed and said first optical means, wherein said image enhancement means includes:

well-corrected imaging optic means, having a third optical axis optically aligned with said fore-optic optical axis, for forming a substantially non-dispersive third optical image of said scene;

a second optical spatial filter means spatially positioned so as to intercept said third optical image, said second spatial filter means including an aperture for passing substantially only those light rays passing through said third optical image; and wherein said second optical spatial filter means is a planar array of optically transmissive apertures separated by optically non-transmissive regions capable of passing substantially all of said multispectra components of said scene.

16. The tunable multispectral optical apparatus of claim 5 further comprising:

translation means for spatially positioning said optical spatial filter means between said first and second optical means in response to a command signal;

output image detector means for intercepting said output image and converting said output image into an electrical signal representation of said output image; and control means responsive to said electrical signal representation of said output image for providing said command signal such that said optical spatial filter means is spatially positioned at an intermediate image plane of a selected spectral component of said intermediate image formed by said first optical means.

17. The tunable multispectral optical apparatus of claim 5 wherein:

said at least one diffractive optical element of said first optical means is constructed to form a limiting aperture of said tunable multispectral optical apparatus.

18. A method of forming a spectrally processed image of a scene containing multispectral components, said method comprising the steps of:

viewing said scene by a hybrid fore optic means and forming an intermediate image on an image side of said hybrid fore-optic means in response to light rays emanating from said scene and impinging upon an object side of said hybrid-fore optic means, wherein said hybrid fore-optic means includes a fore-optic optical axis and a fore-optic focal point associated therewith, and there being at least one diffractive optical element positioned substantially at said fore-optic focal point, forming, in part, a limiting aperture of said hybrid fore-optic means;

viewing said intermediate image by a hybrid reimaging optic including at least one diffractive optical element and forming an output image; and intercepting said intermediate image with an optical spatial filter means selectively configured and positioned between said hybrid fore-optic and said hybrid reimaging optic such that said output image includes only selected ones of said multispectral components of said scene.

19. The method of claim 18 wherein said spatial filter means is a selected one of: (i) an optically non-transmissive medium having a planar array of optically transmissive apertures separated by optically non-transmissive regions, and (ii) an optically transmissive medium having a planar array of light blocking regions separated by optically transmissive regions.

20. A tunable multispectral optical apparatus for forming a spectrally processed image of a scene containing multispectral components, said tunable multispectral optical apparatus comprising:

a hybrid fore-optic means, including at least one diffractive optic element, for forming an intermediate image on an image side of said hybrid fore-optic means in response to light rays emanating from said scene an impinging upon an object side of said hybrid fore-optic means, opposite said image side;

hybrid reimaging optic means, including at least one diffractive optical element, for forming an output image derived from said intermediate image, and optical spatial filter means for intercepting at least a portion of said intermediate image, wherein said spatial filter means is selectively positioned between said hybrid fore-optic means and said hybrid reimaging optic means such that said output image includes only selected ones of said multispectral components of said scene, and wherein said spatial filter means is a selected one of: (i) an optically non-transmissive medium having a planar array of optically transmissive apertures separated by optically non-transmissive regions, and (ii) an optically transmissive medium having a planar array of light blocking regions separated by optically transmissive regions.

* * * * *